(12) United States Patent
Hofman

(10) Patent No.: US 9,188,733 B2
(45) Date of Patent: Nov. 17, 2015

(54) PANEL LIGHT ASSEMBLY

(71) Applicant: William K Hofman, Ada, MI (US)

(72) Inventor: William K Hofman, Ada, MI (US)

(73) Assignee: Steelcase Inc., Grand Rapids, MI (US)

( * ) Notice: Subject to any disclaimer, the term of this patent is extended or adjusted under 35 U.S.C. 154(b) by 343 days.

(21) Appl. No.: 13/913,254

(22) Filed: Jun. 7, 2013

(65) Prior Publication Data

US 2014/0362602 A1  Dec. 11, 2014

(51) Int. Cl.
| | |
|---|---|
| *F21V 8/00* | (2006.01) |
| *E04B 2/78* | (2006.01) |
| *F21V 33/00* | (2006.01) |
| *E04B 2/76* | (2006.01) |
| *E04B 2/74* | (2006.01) |
| *F21W 131/402* | (2006.01) |
| *F21Y 101/02* | (2006.01) |
| *F21Y 103/00* | (2006.01) |

(52) U.S. Cl.
CPC ............ *G02B 6/0095* (2013.01); *E04B 2/7455* (2013.01); *E04B 2/7863* (2013.01); *F21V 33/006* (2013.01); *E04B 2/765* (2013.01); *E04B 2002/7462* (2013.01); *E04B 2002/7464* (2013.01); *E04B 2002/7483* (2013.01); *E04B 2002/7487* (2013.01); *F21W 2131/402* (2013.01); *F21Y 2101/02* (2013.01); *F21Y 2103/003* (2013.01); *G02B 6/0088* (2013.01)

(58) Field of Classification Search
CPC .... G02B 6/0095; E04B 2/7455; F21V 33/006
USPC .......................... 362/633, 147, 362
See application file for complete search history.

(56) References Cited

U.S. PATENT DOCUMENTS

| | | | |
|---|---|---|---|
| 1,336,967 | A | 4/1920 | Laird |
| 3,389,246 | A | 6/1968 | Shemitz |
| 4,293,901 | A | 10/1981 | Hernandez |
| 4,546,419 | A | 10/1985 | Johnson |
| 4,551,791 | A | 11/1985 | Salansky |
| 4,748,543 | A | 5/1988 | Swarens |
| 5,032,958 | A | 7/1991 | Harwood |
| 5,155,955 | A | 10/1992 | Ball et al. |
| 5,536,558 | A | 7/1996 | Shelton |
| 5,649,757 | A | 7/1997 | Aleman et al. |
| 5,806,967 | A | 9/1998 | Soorus et al. |
| 6,011,602 | A | 1/2000 | Miyashita et al. |
| 6,062,704 | A | 5/2000 | Holder |

(Continued)

FOREIGN PATENT DOCUMENTS

| | | |
|---|---|---|
| DE | 3706110 | 6/1988 |
| DE | 10064742 | 6/2002 |

(Continued)

*Primary Examiner* — David V Bruce
(74) *Attorney, Agent, or Firm* — Quarles & Brady LLP

(57) ABSTRACT

A panel light assembly for use with a support frame including at least first and second support frame members, the assembly comprising an assembly frame including at least a first assembly frame member and a second assembly frame member spaced apart on opposite sides of a frame space, the first assembly frame member forming a channel, a light source supported by the first assembly frame member within the channel, a light guide member including at least one edge, the light guide supported by the first and second assembly frame members within the frame space with at least a portion of the at least one edge located adjacent the light source, a fastener for fastening the assembly frame to the first and second support frame members.

21 Claims, 31 Drawing Sheets

(56) References Cited

U.S. PATENT DOCUMENTS

| | | |
|---|---|---|
| 6,339,907 B1 | 1/2002 | Dame et al. |
| 6,341,457 B1 | 1/2002 | Aerts et al. |
| 6,393,783 B2 | 5/2002 | Emaus et al. |
| 6,497,075 B1 | 12/2002 | Schreiner et al. |
| 6,520,654 B2 | 2/2003 | Angell et al. |
| 6,641,284 B2 | 11/2003 | Stopa et al. |
| 6,663,267 B2 | 12/2003 | Newhouse et al. |
| 6,945,672 B2 | 9/2005 | Du et al. |
| 6,988,813 B2 | 1/2006 | Hoelen et al. |
| 7,108,394 B1 | 9/2006 | Swarens |
| 7,119,829 B2 | 10/2006 | Leonard et al. |
| 7,217,009 B2 | 5/2007 | Klose |
| 7,229,192 B2 | 6/2007 | Mayfield, III et al. |
| 7,348,736 B2 | 3/2008 | Piepgras et al. |
| 7,400,439 B2 | 7/2008 | Holman |
| D574,994 S | 8/2008 | Boyer |
| 7,559,672 B1 | 7/2009 | Parkyn et al. |
| 7,578,600 B2 | 8/2009 | Czajkowski |
| 7,607,794 B1 | 10/2009 | Thompson |
| 7,658,513 B2 | 2/2010 | Peck |
| 7,682,040 B2 | 3/2010 | Stöber |
| 7,784,204 B2 | 8/2010 | Staats et al. |
| 7,926,984 B2 | 4/2011 | Su |
| 8,113,680 B2 | 2/2012 | O'Brien et al. |
| 8,125,586 B2 | 2/2012 | Byoun et al. |
| 8,157,420 B2 | 4/2012 | Song et al. |
| 8,176,695 B2 | 5/2012 | Deweerd et al. |
| 8,197,110 B2 | 6/2012 | Czajkowski |
| 8,206,005 B2 | 6/2012 | Czajkowski |
| 8,231,257 B2 | 7/2012 | Griffiths et al. |
| 8,419,265 B2 | 4/2013 | Tsai et al. |
| 8,425,101 B2 | 4/2013 | Boonekamp |
| 8,425,103 B2 | 4/2013 | Wang |
| 8,426,744 B2 | 4/2013 | Hayashi |
| 8,427,602 B2 | 4/2013 | Mun et al. |
| 8,427,603 B2 | 4/2013 | Ishikawa et al. |
| 8,430,551 B2 | 4/2013 | Kim et al. |
| 8,432,525 B2 | 4/2013 | Choi et al. |
| 8,522,494 B2 * | 9/2013 | Ward ............................... 52/174 |
| 2005/0257435 A1 | 11/2005 | Rottcher |
| 2008/0192456 A1 | 8/2008 | Van Tertholen et al. |
| 2008/0298058 A1 | 12/2008 | Kan et al. |
| 2009/0147504 A1 * | 6/2009 | Teeters ........................ 362/153 |
| 2010/0220469 A1 | 9/2010 | Ivey et al. |
| 2011/0090685 A1 | 4/2011 | Peck |

FOREIGN PATENT DOCUMENTS

| | | |
|---|---|---|
| DE | 10242938 | 3/2004 |
| DE | 202008001448 | 6/2008 |
| EP | 1052364 | 11/2000 |
| EP | 2420873 | 2/2012 |
| FR | 2211625 | 7/1974 |
| JP | 8096620 | 4/1996 |
| JP | 2002201743 | 7/2002 |
| JP | 2006324138 | 11/2006 |
| JP | 2010120162 | 6/2010 |
| WO | WO9726584 | 7/1997 |
| WO | WO0107828 | 2/2001 |
| WO | WO2008144656 | 11/2008 |
| WO | WO2011100135 | 8/2011 |

* cited by examiner

PANEL LIGHT ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is a panel light assembly, and more specifically panel light assemblies designed to be configured and/or associated with a wall or other structure to create an optimal lighting pattern within an area such as a workspace, office, conference room, or the like, for facilitating various tasks.

Lighting systems of one type or another are provided in virtually all workplace spaces to enable users of those spaces to carry on various activities. For instance, lighting is usually required to carry out general work tasks such as illuminating the top of a desk or table top surface for general use, illuminating a conference room for in person meetings, illuminating conferees participating in a telepresence activity, etc.

Different light patterns are optimal for facilitating different types of activities. For instance, for general use activities, intense light directed downward onto a desk top is usually considered optimal as a space user is typically looking down at materials located on the top surface of the desk. As another instance, for in person meeting spaces, general area light is usually considered optimal as such lighting illuminates meeting attendees as well as the top surface of a conference table for viewing attendee materials. As still one other instance, for telepresence activities, light should illuminate a participating conferee from various sides and directions to avoid generating unintended shadows which adversely affect image quality. In addition, for telepresence activities, the light should generally be indirect to avoid cases where a conferee has a direct line of sight to the light source which can cause eye fatigue and cases where light is shown directly into a camera field of view.

While it is known that different light patterns are optimal for different user tasks, in many cases space uses and optimized light requirements for different uses are an afterthought. In this regard, in many cases office space is generally designed to include a sort of one size fits all lighting system which provides a maximum area lighting capability configured to light all space equally. Typically, these systems include large panel ceiling lighting assemblies where each assembly includes elongated fluorescent light bulbs and related reflectors and diffusers mounted in assembly housings. In many cases the number of lighting assemblies for each space is determined as a function of the square feet of the space. When illuminated, the assemblies essentially fill the space with generally downwardly directed light patterns. Thus, a private office space, a conference room, a space used for telepresence activity, etc., are all provided with the same ceiling mounted lighting assemblies in different patterns based solely on the size and shape of the space.

While this solution may work well for some space uses, unfortunately this solution is not optimal in other uses. For instance, many people find that general ceiling mounted lighting assemblies do not provide sufficiently intense light for general desk activities. As another instance, general ceiling light systems often generate light patterns that result in poor or at least less than optimal conditions for generating telepresence images during telepresence activities.

In the case of general desk activities in a personal office space or the like, additional desk or floor supported task lighting is often used to supplement the ceiling lighting assemblies. Here, the task lighting increases light intensity on the top surface of a user's desk while the ceiling lighting assemblies still provide general ambient light to an area.

In the case of a space used for telepresence activities, one solution has been to mount lights within an office wall or a panel of a panel wall system to direct light generally horizontally to illuminate a telepresence user's face. To this end, some exemplary systems include an assembly having a light source and a reflector mounted within a housing where the entire assembly can be mounted within a wall opening. In many cases the reflector is juxtaposed with respect to the light source so that the light source is hidden from direct view and the reflector reflects light toward a user's face in an attempt to generate an optimized light pattern.

Another solution has been to provide a light guide panel assembly that includes a light guide panel member having an edge and a line of LEDs arranged along the edge to direct light into the panel. The panel can include light dispersing features that cause light to be directed from a side surface thereof to illuminate a space. Here, the assembly can be made relatively thin and still provide a side surface which has a glowing effect that results from the light dispersing features.

While source and reflector wall mounted assemblies generate a light pattern that can illuminate a user's face, these assemblies have several shortcomings. First, in known cases, while light from these sources is indirect, the pattern of light emanating from the reflector is not uniform so that some parts of the reflector appear bright (e.g., like a direct light source) while other parts appear dark. The bright parts of the reflected light tend to have the same effect as a source that generates light that directly subtends a user's eye. The bright reflected light can adversely effect a user's vision almost immediately and over time the bright reflected light causes user eye fatigue.

Second, because some parts of the reflector appear bright while other parts appear dark, the light pattern resulting from these assemblies is typically non-uniform. Non-uniform light causes reflection artifacts that show up in resulting telepresence images and can be distracting to remote image viewers. This is particularly true in cases where a user is located relatively close to a wall mounted light assembly where pattern irregularities are more defined when they subtend a user's face or other object.

Third, many wall mounted light assemblies that include a light source and an associated reflector have dimensions that render the assemblies unsuitable for mounting in certain types of walls. For instance, many office spaces are now configured using panel or architectural wall assemblies that include a relatively thin frame structure with decorative fascia panels mounted thereto. The decorative panels may include glass panels, opaque wood grain, fabric covered, etc., panels, or other types of panels. Here, the frame structure is often within a range between two and five inches thick which is insufficient for housing most wall mounted assemblies. This is especially true in cases where at least some of the space defined by the frame structure is required to mount a fascia panel adjacent one of the light assemblies. For instance, where a frame structure has first and second sides and a decorative fascia panel is mounted to the frame structure to finish off the first side, the mounting components for the decorative frame panel often obstruct the space within the frame structure thereby rendering that space unusable for mounting a light assembly.

Fourth, even in cases where a wall mounted light assembly may have a depth dimension suitable for mounting within a panel or architectural wall structure, in known cases light assemblies do not include any features to facilitate such mounting.

Known light guide wall assemblies also have several shortcomings. First, often these assemblies are not bright enough to provide sufficient intensity for illuminating a user during telepresence activities.

Second, there is no known configuration using this type of assembly where the light assembly is located at a location optimized to facilitate telepresence activity. For instance, a glowing conference room wall in a large conference space may be aesthetically pleasing but where that wall is not juxtaposed in front of and near the face of a telepresence system user, a suitable lighting effect for telepresence activity does not occur.

Third, known wall mounted light guide systems include structure that is not suitable for use with panel or architectural wall frame structures such that the systems can be mounted within a frame in a modular fashion.

SUMMARY OF THE DISCLOSURE

It has been recognized that disadvantages associated with current workspace lighting schemes can be substantially overcome by providing a light assembly including a light guide panel and an edge light source in a panel frame structure that is located at specific locations within wall structures proximate a telepresence system to illuminate a telepresence system user. To this end, in at least some embodiments a light guide assembly may be mounted within a wall structure just to the rear of and above a telepresence display screen and camera so that light generated thereby is shown on a telepresence system user to the front of the display screen. In this case the glowing effect of the light assembly on the user can have a substantially uniform lighting effect on the user and, because of the juxtaposition, can have an intensity suitable for illuminating the user optimally for telepresence activity.

It has also been recognized that, in at least some cases, providing light to different sides of a telepresence user can result in even better telepresence images. To this end, in at least some embodiments light guide assemblies may be provided within multiple walls of a conference space such as, for instance, a wall in front of a system user and one or more walls to the side(s) of the user, where the combined light from the assemblies is tuned to optimally illuminate the user from the front and side directions. Here, the combined light from the guides has a combined intensity that would be difficult at best to achieve using only a front mounted guide assembly which renders the light guide type devices suitable for the intended telepresence activities.

It has further been recognized that the light guide assemblies can include a light frame suitable for mounting to an office panel or architectural wall frame structure in a modular fashion so that one or more assemblies can be optionally added to the frame structure to provide light in an adjacent space. Here, in some cases the light frame may be designed to take up less than half the width of the supporting frame structure so that two light assemblies can be mounted back to back within one frame space to shine light to opposite sides of the frame structure. In other embodiments the light frame may extend further into the supporting frame so that only a panel fascia can be mounted to the opposite side.

At least some embodiments include a panel light assembly for use with a support frame including at least first and second support frame members, the assembly comprising an assembly frame including at least a first assembly frame member and a second assembly frame member spaced apart on opposite sides of a frame space, the first assembly frame member forming a channel, a light source supported by the first assembly frame member within the channel to emit light within the channel, a light guide member including a front surface and a rear surface and at least one edge between the front and rear surfaces, the light guide supported by the first and second assembly frame members within the frame space with at least a portion of the at least one edge located within the channel formed by the first assembly frame member adjacent the light source, a fastener for fastening the assembly frame to the first and second support frame members, wherein, after the assembly frame is fastened to the first and second support frame members, the front surface of the light guide member faces an open space adjacent the support frame.

In some cases each of the first and second assembly frame members includes first and second ends and the assembly frame further includes third and fourth assembly frame members, the third assembly frame member extending between and connected to the first ends of the first and second assembly frame members and the fourth assembly frame member extending between and connected to the second ends of the first and second assembly frame members, each of the assembly frame members forming a channel and receiving at least a portion of the edge of the light guide member.

Some embodiments further include a flange member supported by the assembly frame and forming a surface that at least in part circumscribes the front surface of the light guide member and that angles outwardly from the front surface. In some cases the flange member surface that angled outwardly from the front surface is reflective. Some embodiments further include an at least partially translucent cover member supported by the assembly frame on a side of the light guide member adjacent the front surface.

In some cases the flange member surface extends between the light guide member and the cover member. In some cases the cover member is a diffuser member. Some embodiments further include a reflector member supported by the assembly frame on a side of the light guide member adjacent the rear surface. In some cases the reflector member includes a reflective surface that faces the rear surface of the light guide member. Some embodiments further include an at least partially translucent cover member supported by the assembly frame on a side of the light guide member adjacent the front surface.

In some cases each of the first and second assembly frame members includes first and second ends and the assembly frame further includes third and fourth assembly frame members, the third assembly frame member extending between and connected to the first ends of the first and second assembly frame members and the fourth assembly frame member extending between and connected to the second ends of the first and second assembly frame members, each of the assembly frame members forming a channel and receiving at least a portion of the edge of the light guide member, each of the cover member and the reflector member including an edge and the assembly frame members each including additional channels for receiving edges of the cover member and the reflector member.

In some cases the light source comprises a strip of LEDs mounted to a circuit board which is in turn mounted within the channel formed by the first assembly frame member. In some cases the first and second support frame members form a support frame space and facing channels, the fastener extends into each of the facing channels to secure the frame assembly to the support frame and at least portions of the first and second assembly frame members are disposed to one side of the support frame space. In some cases each of the first and second assembly frame members forms a finished fascia to the one side of the support frame space, the assembly further including at least one opaque panel assembly mounted to the support frame adjacent the panel light assembly, the finished fascia of the assembly frame members substantially flush with an external finished surface of the opaque panel assembly.

Other embodiments include a panel light assembly for use with a support frame including at least top and bottom support frame members, the assembly comprising an assembly frame including assembly frame members that form a rectangular assembly frame that defines a frame space, the assembly frame members forming at least a first continuous channel about an internal portion of the assembly frame, a line light source supported within the channel formed by at least one of the assembly frame members, a rectangular light guide member including a front surface, a rear surface and a circumscribing edge between the front and rear surfaces, the circumscribing edge received in the channel formed by the assembly frame members with at least a portion of the edge adjacent the line light source, a fastener for fastening the assembly frame to the first and second support frame members, wherein, after the assembly frame is fastened to the first and second support frame members, the front surface of the light guide member faces an open space adjacent the support frame.

Some embodiments further include at least a second line light source supported within the channel formed by at least a second of the assembly frame members. Some embodiments further include a rectangular reflector member supported within the assembly frame adjacent the rear surface of the light guide member and a cover member supported within the assembly frame adjacent the front surface of the light guide member. In some cases the fastener includes an upper bracket mounted to an upper assembly frame member wherein the upper bracket cooperates with the top frame member of the support frame to secure the assembly frame to the support frame.

In some cases the upper bracket includes a leaf spring arm member that engages a downward facing channel formed by the top frame member. Some embodiments further include a lower bracket including at least one wedge surface that cooperates with the bottom frame member of the support frame to secure the assembly frame to the support frame.

Still other embodiments include a panel light assembly for use with a support frame including at least top and bottom support frame members that form facing channels, the assembly comprising an assembly frame including assembly frame members that form a rectangular assembly frame that defines a frame space, the assembly frame members forming at least a first continuous channel about an internal portion of the assembly frame, the assembly frame members including an upper assembly frame member, a line light source supported within the channel formed by at least one of the assembly frame members, a rectangular light guide member including a front surface, a rear surface and a circumscribing edge between the front and rear surfaces, the circumscribing edge received in the channel formed by the assembly frame members with at least a portion of the edge adjacent the line light source and a bracket including a leaf spring arm member that mounts to the upper assembly frame member and that is at least in part received in the channel formed by the top frame member of the support frame to secure the assembly frame to the support frame.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

FIG. 16A is an isometric view of the upper horizontal extrusion members of the front and rear support frames of FIG. 16;

FIG. 16B is an isometric view of the lower horizontal extrusion members of the front and rear support frames of FIG. 16;

DETAILED DESCRIPTION OF THE DISCLOSURE

Figure 1:
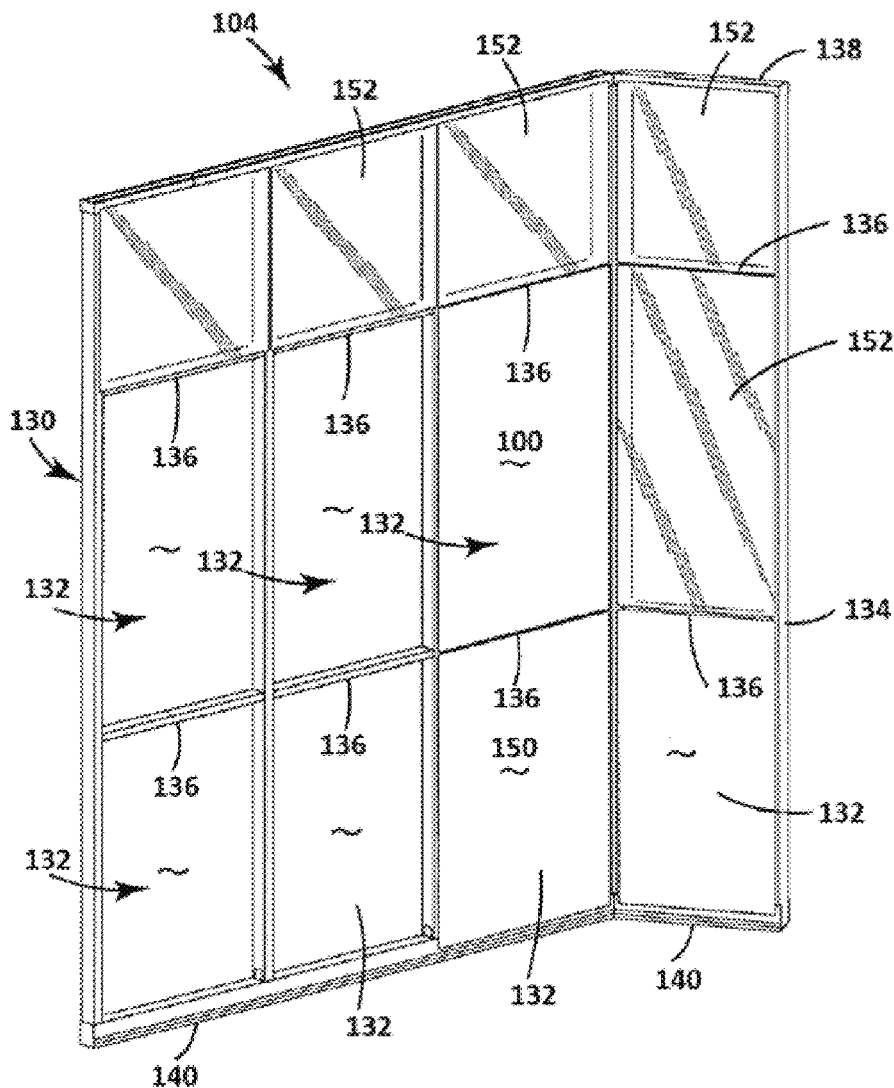
FIG. 1 is an isometric view of a panel wall system according to embodiments of the present invention.

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring now to the drawings wherein like reference numerals correspond to similar components throughout the several views and more specifically referring to FIGS. 1 through 6, embodiments of the invention will be described in the context of an architectural wall assembly 104 that can be configured to operate as a barrier to separate adjacent spaces and to, in at least some cases, configure private or semi-private workspaces for use by individuals, small groups of people or larger groups. The exemplary wall assembly 104 includes a plurality of vertical frame members 134 and horizontal frame members 136, a ceiling track 138, a cover member 140 and a plurality of panel assemblies 132 including opaque panel assemblies 150, glass/window panel assemblies 152 and panel light panel assemblies 100.

Figure 3:
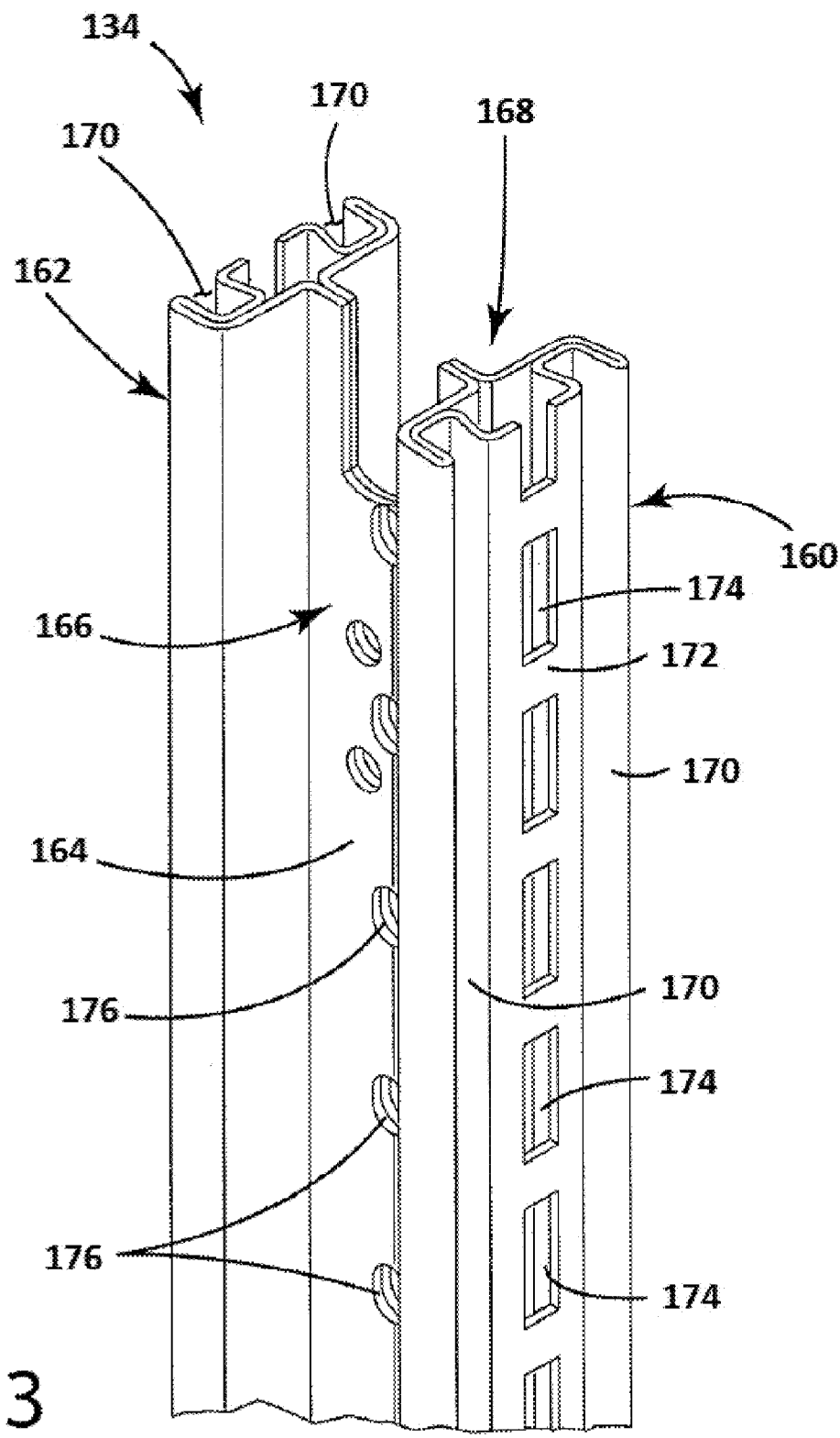
FIG. 3 is an isometric view of a vertical frame member.
Figure 4:
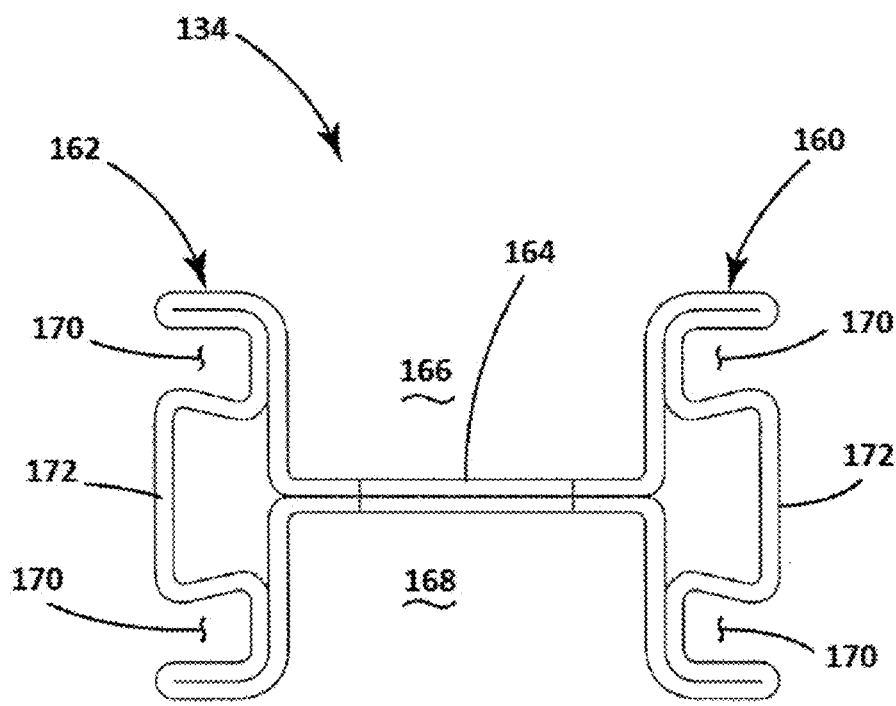
FIG. 4 is a cross-sectional view of the vertical frame member of FIG. 3.

The vertical and horizontal frame members 134 and 136 are constructed in the same manner and have similar features and therefore, only one vertical frame member 134 and one horizontal frame member 136 will be described here in detail in the interest of simplifying this explanation. Referring to FIGS. 3 and 4, exemplary frame member 134 includes a generally "I"-shaped cross-section having a first and second parallel leg members 160 and 162 with a web portion 164 disposed there between defining central longitudinally extending first and second channels 166, 168. Each of the first and second leg members 160, 162 forms two outwardly opening channels 170 that are disposed on either side of a slotted channel 172 having slots 174 that are equi-spaced along a length thereof. Web portion 164 further comprises apertures 176 for coupling of adjacent frame members or other assembly components. Frame member 134 may be formed using any rigid material. In at least some embodiments member 134 is formed of bent steel sheet.

Figure 5:
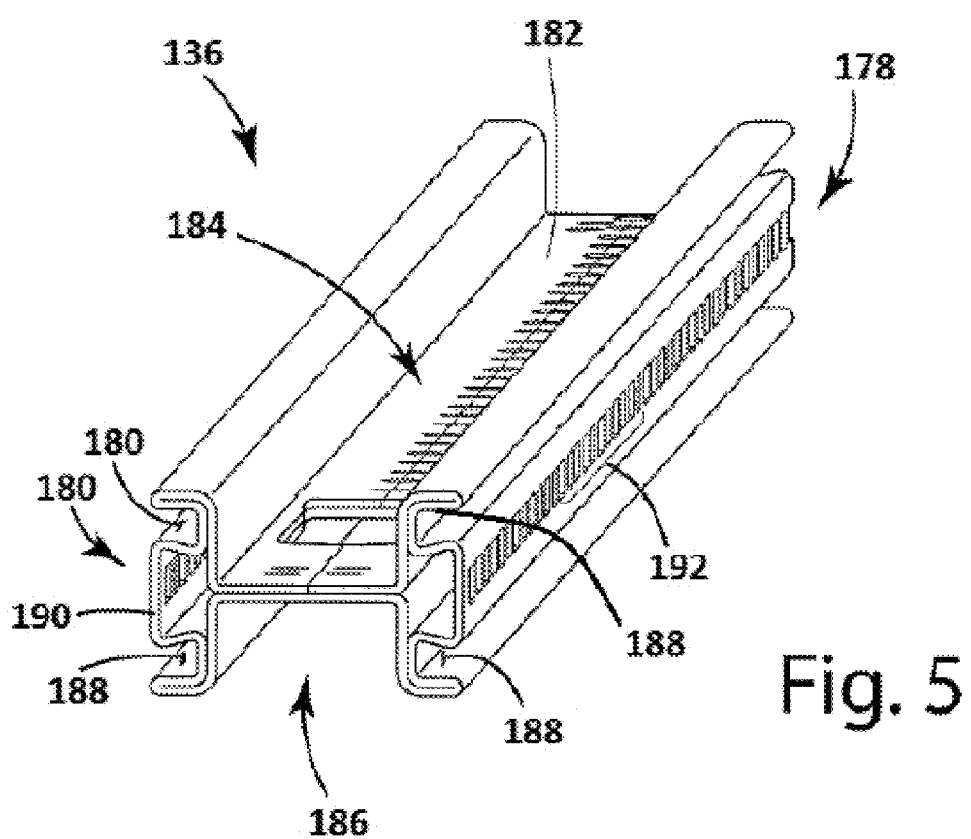
FIG. 5 is a isometric view of a horizontal frame member.

As shown in FIG. 5, each horizontal frame member 136 includes a generally "I"-shaped cross-section having first and second arm members 178 and 180 with a web portion 182 disposed there between defining central longitudinally extending first and second upwardly and downwardly opening channels 184, 186. Each of the first and arm members 178, 180 similarly forms two outwardly opening channels 188 that are disposed on either side of a slotted channel 190, having slots 192 that are spaced along a length thereof.

Figure 6:
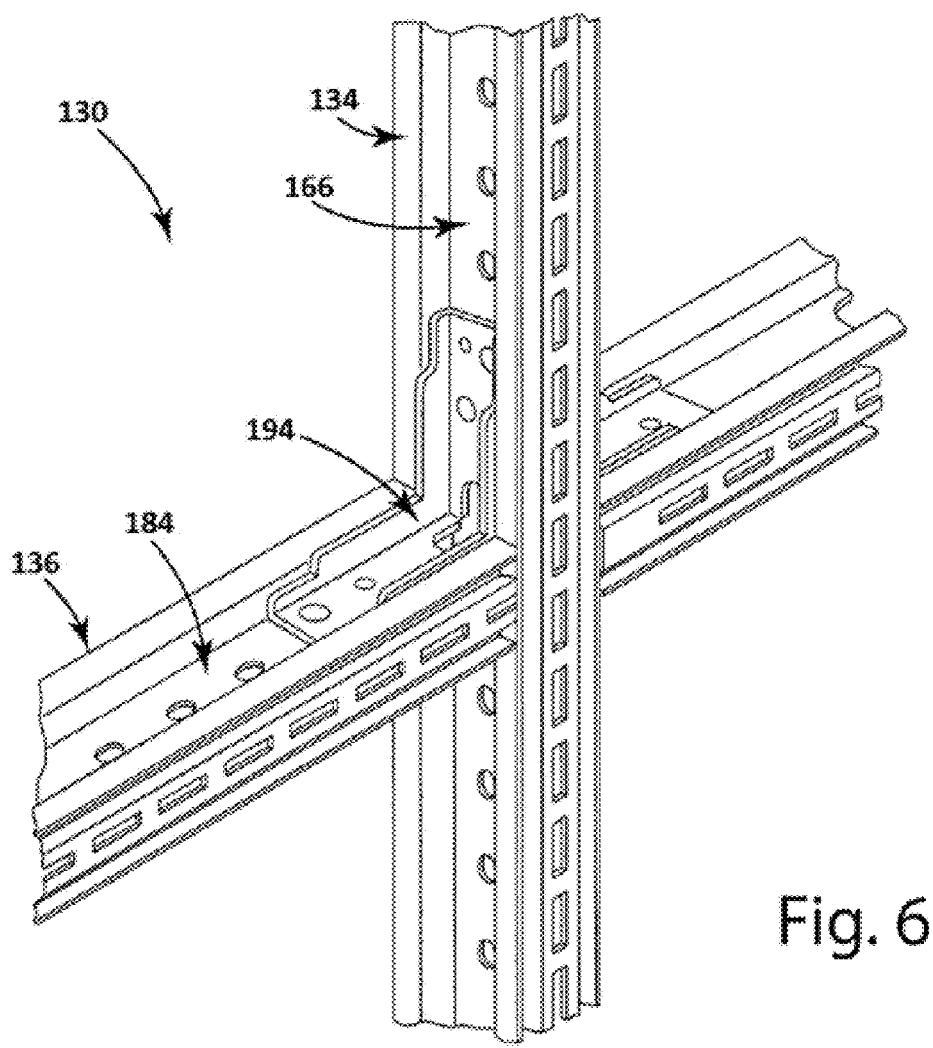
FIG. 6 is a isometric view of a frame assembly.
Figure 7:
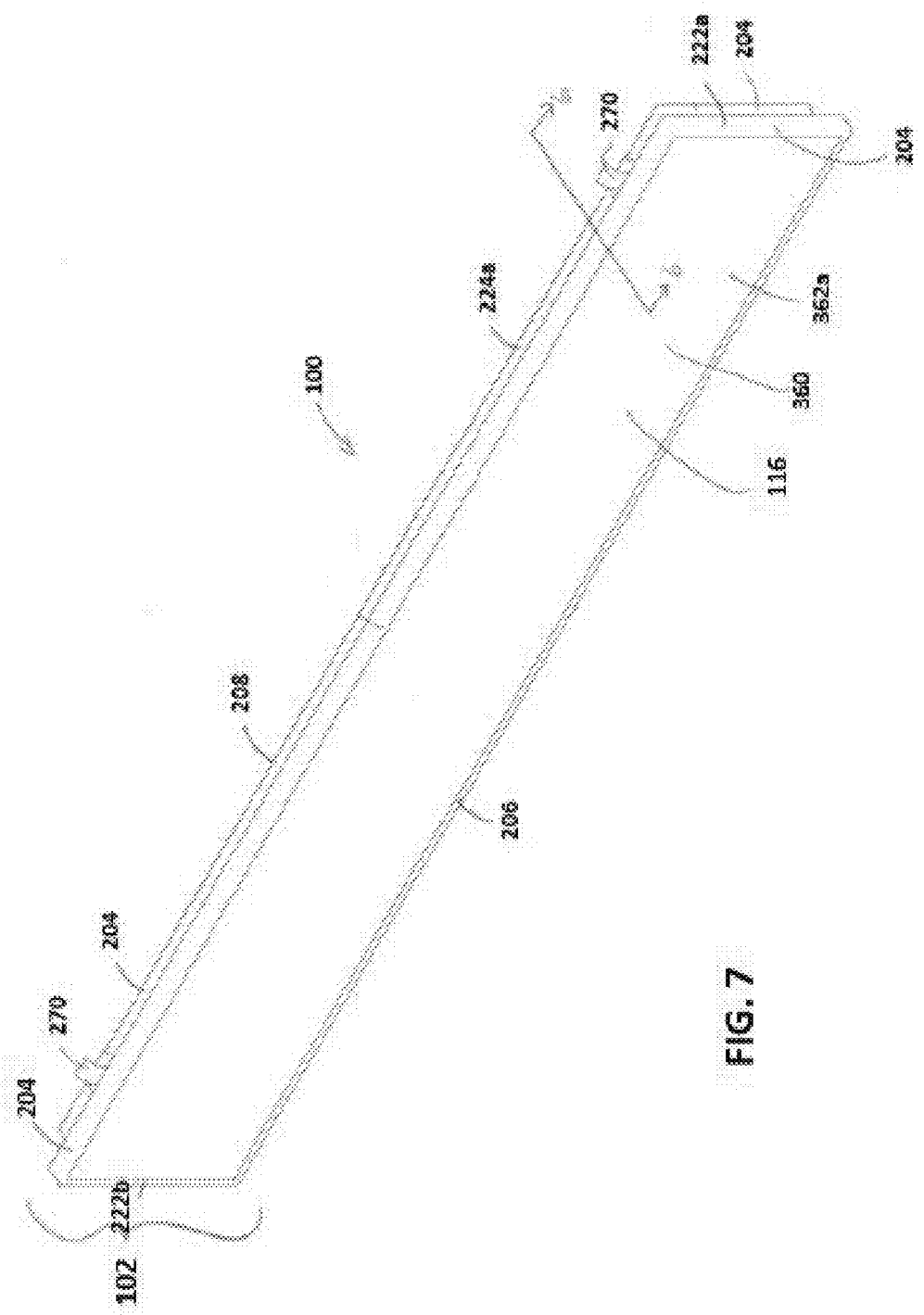
FIG. 7 is an isometric view of a panel light assembly including a frame, one or more panels, and a light source that is consistent with at least some aspects of the present invention.
Figure 8:
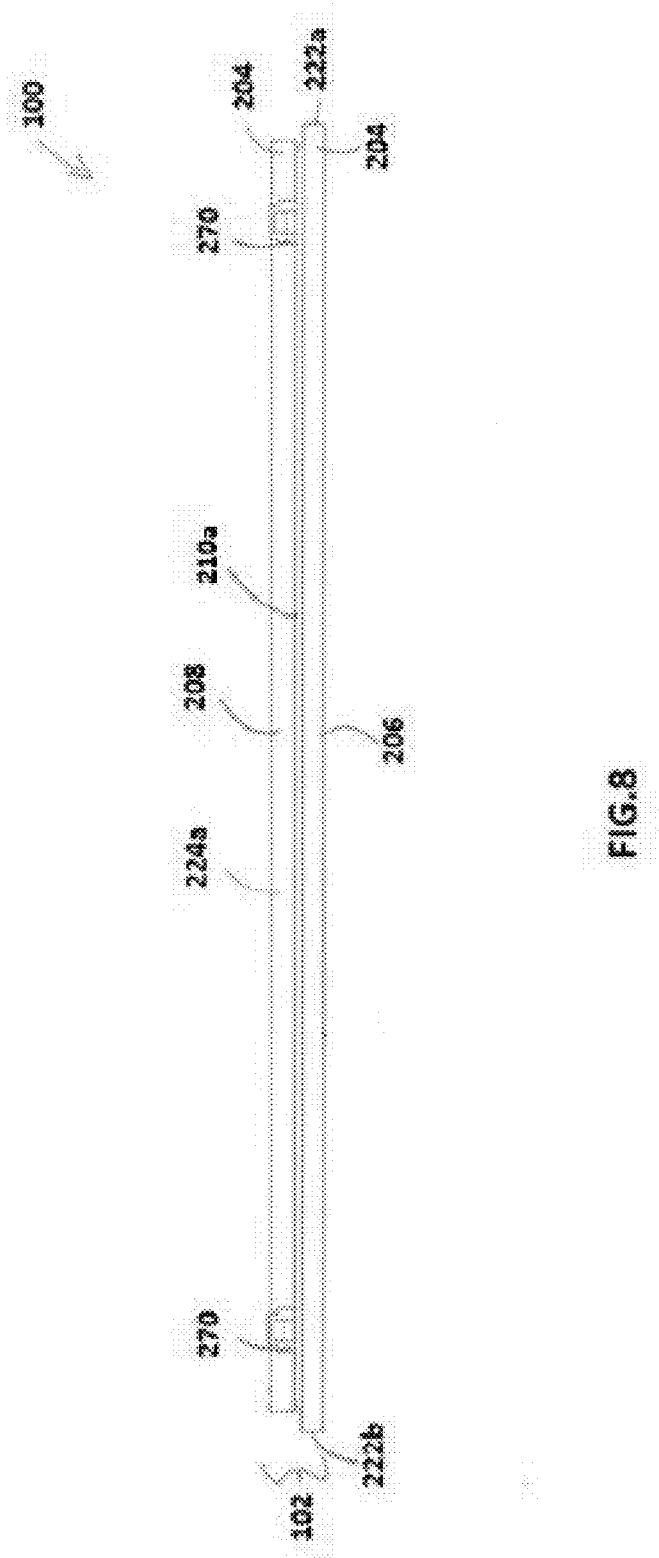
FIG. 8 is a top plan view of the panel light assembly of FIG. 7.
Figure 9:
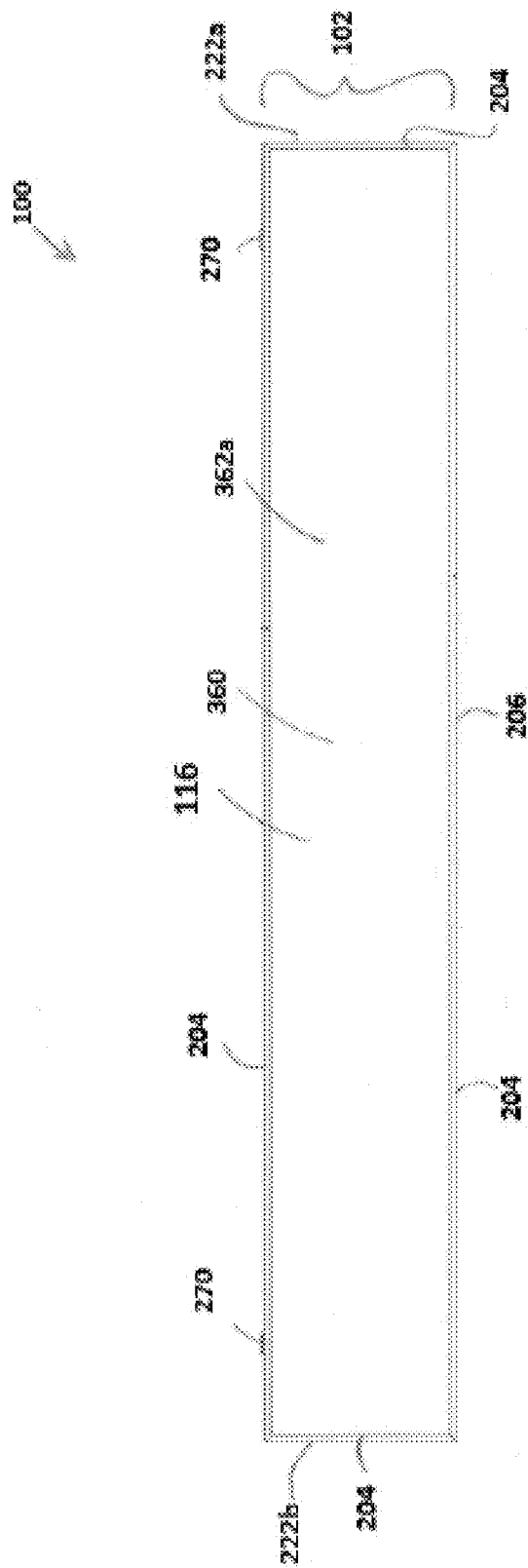
FIG. 9 is a front elevational view of the panel light assembly of FIG. 7.
Figure 10:
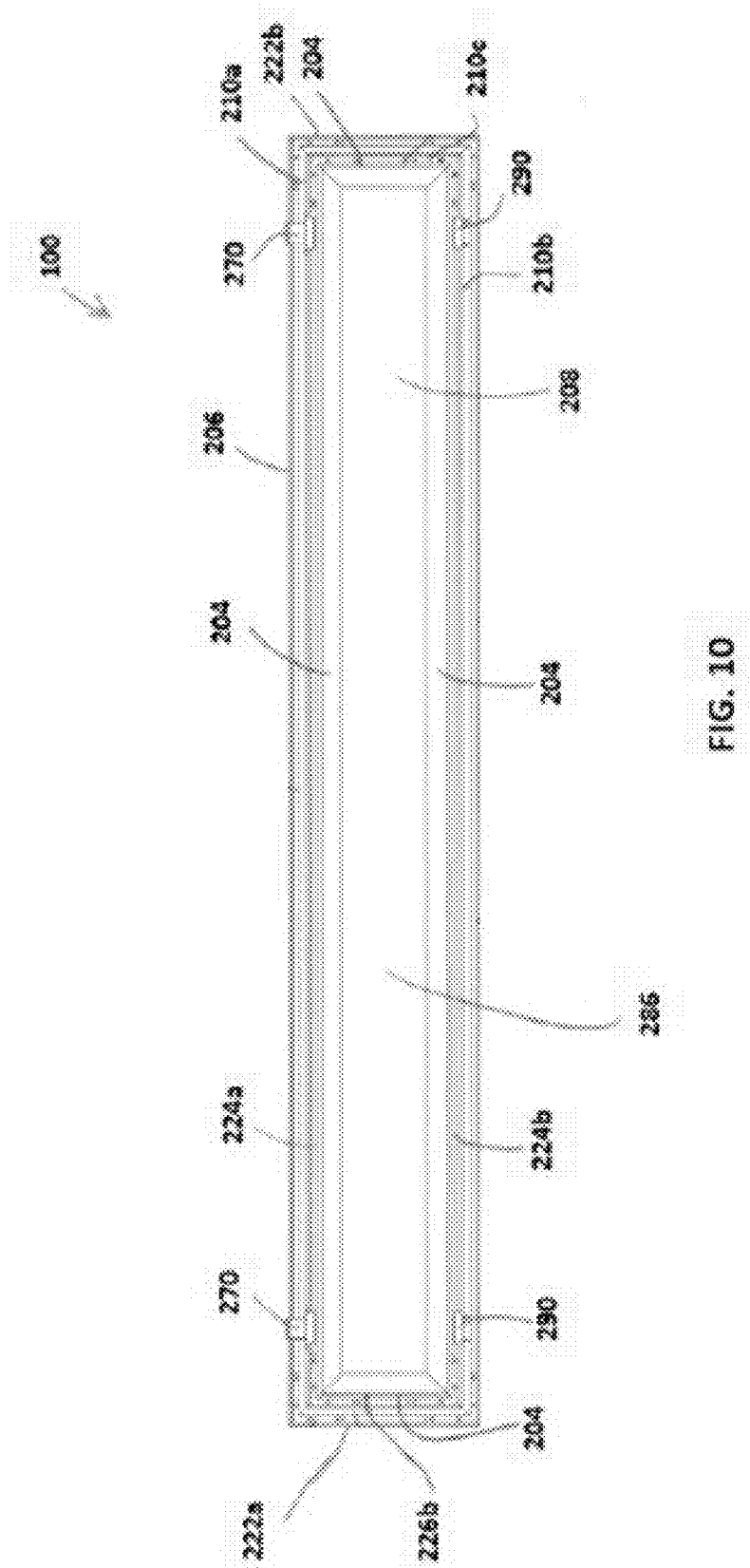
FIG. 10 is a rear elevational view of the panel light assembly of FIG. 7.
Figure 11:
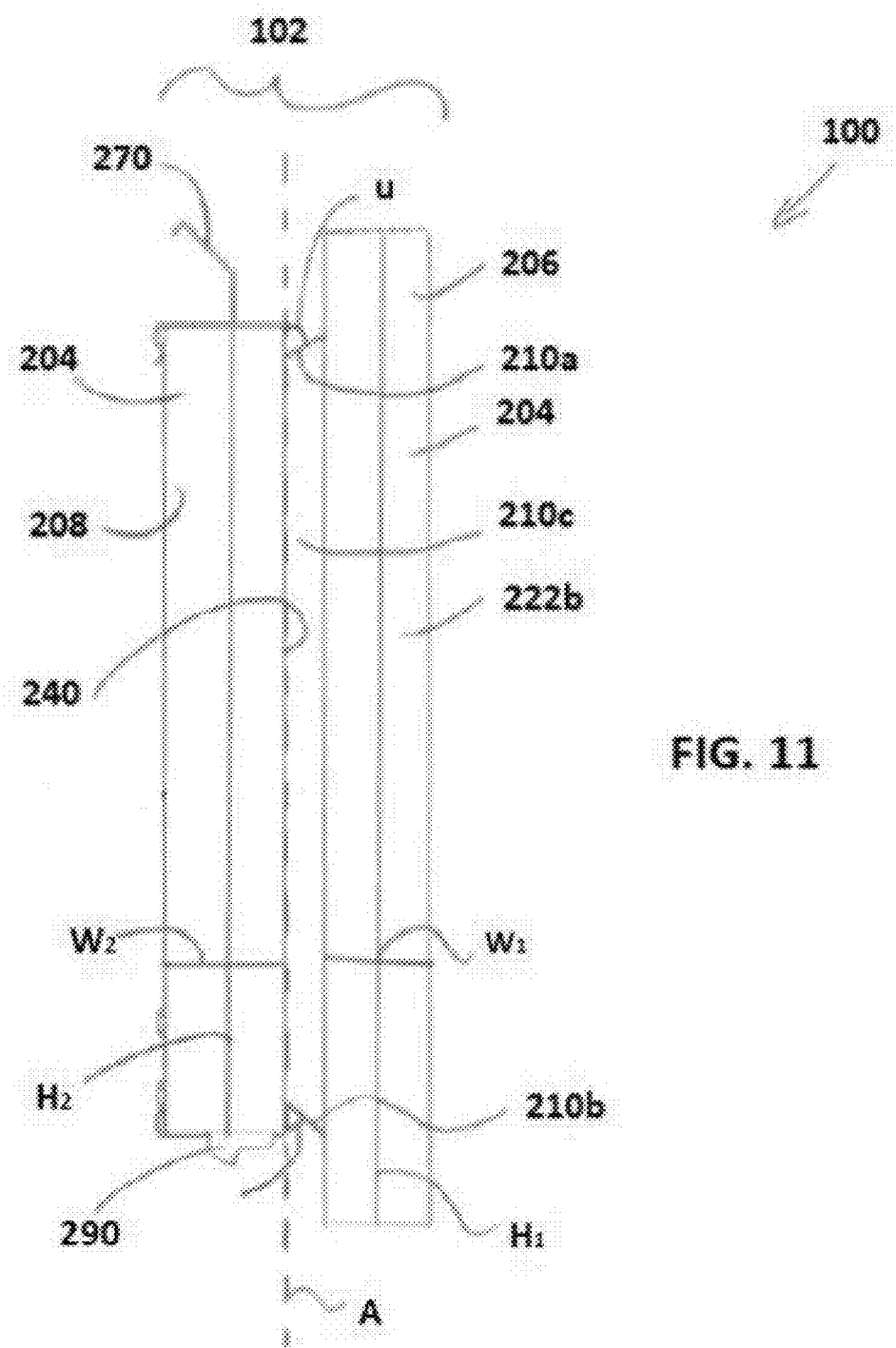
FIG. 11 is a right side elevational view of the panel light assembly of FIG. 7, wherein the left side elevational view is a mirror image of the right side elevational view.

Referring to FIG. 6, "L"-shaped brackets 194 are provided that are dimensioned to be received in the channels 166 and 184 of adjacent frame members 134 and 136 and are used to secure vertical and horizontal frame members 134, 136 together to form supporting frame structure 130.

Referring again to FIG. 1, after a frame structure 130 has been assembled, one or more of the panel assemblies 150, 152, 100 may be secured to or otherwise mounted within the frame structure 104 to form the barrier wall assembly 104. In at least some embodiments, wall assembly 104 is configured to have one or more assemblies 150, 152, 100 disposed on a first side of the frame assembly 130 with one or more assemblies 150, 152, 100 disposed on an opposing side of the frame assembly 130 in a substantially parallel spaced apart relationship.

Figure 17:
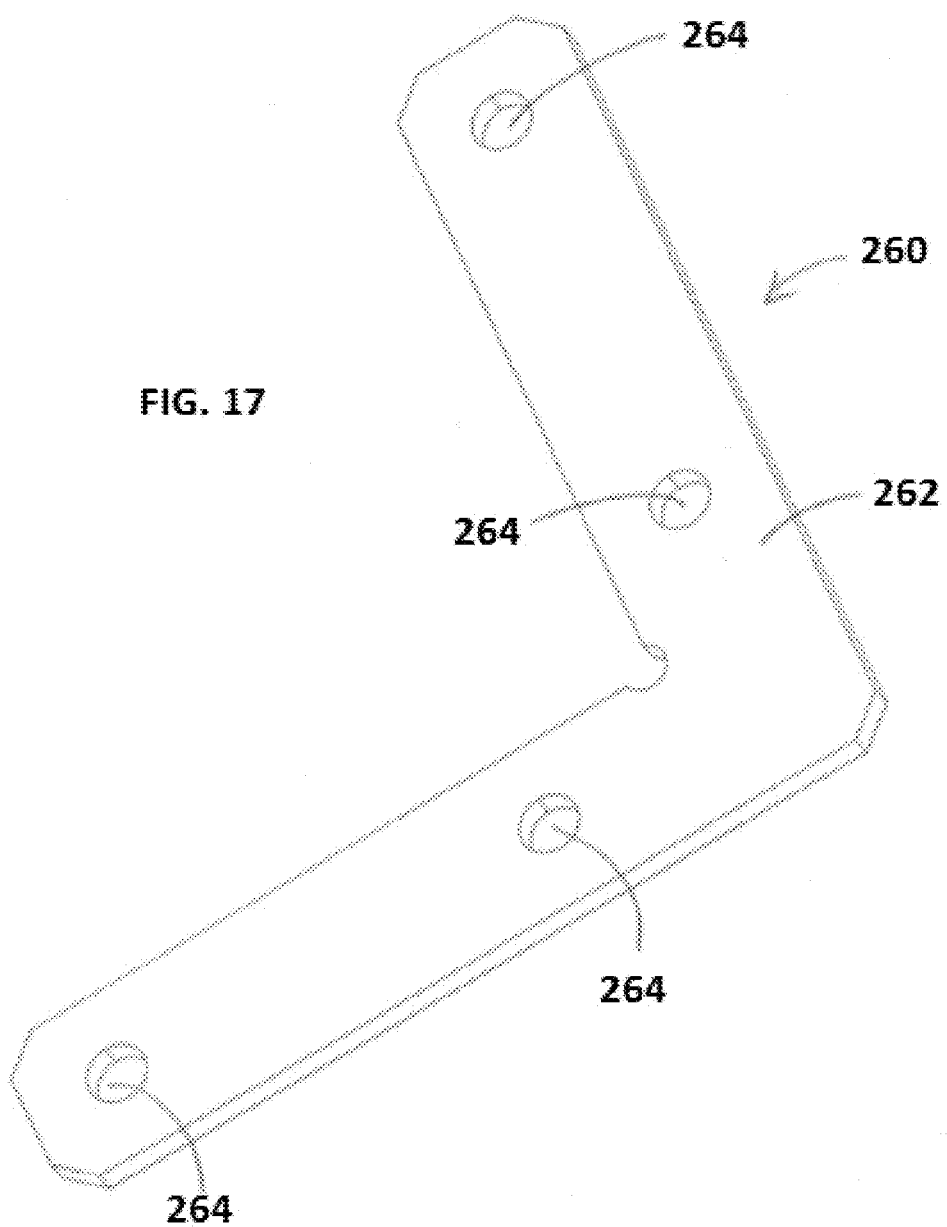
FIG. 17 is an isometric view of a connection member optionally utilized with the panel light assembly of FIG. 7.
Figure 18:
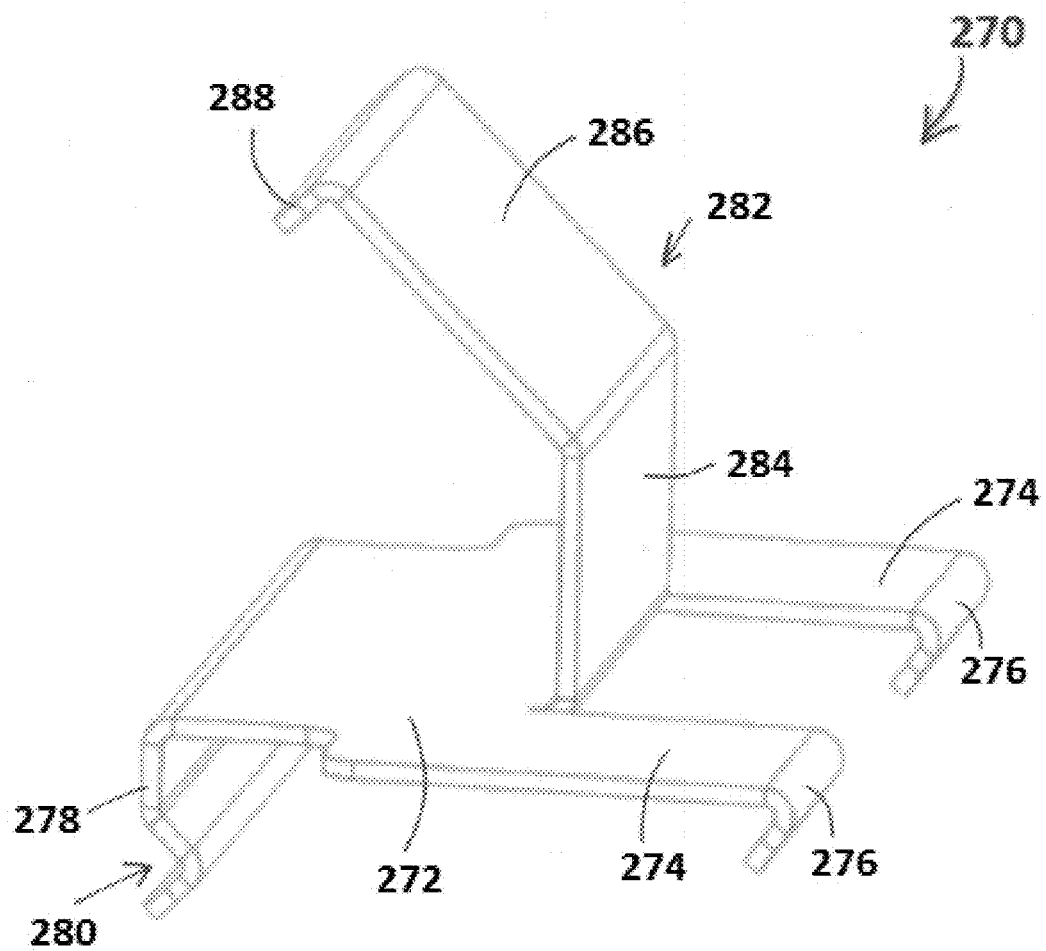
FIG. 18 is an isometric view of an upper attachment component optionally utilized with the panel light assembly of FIG. 7.
Figure 19:
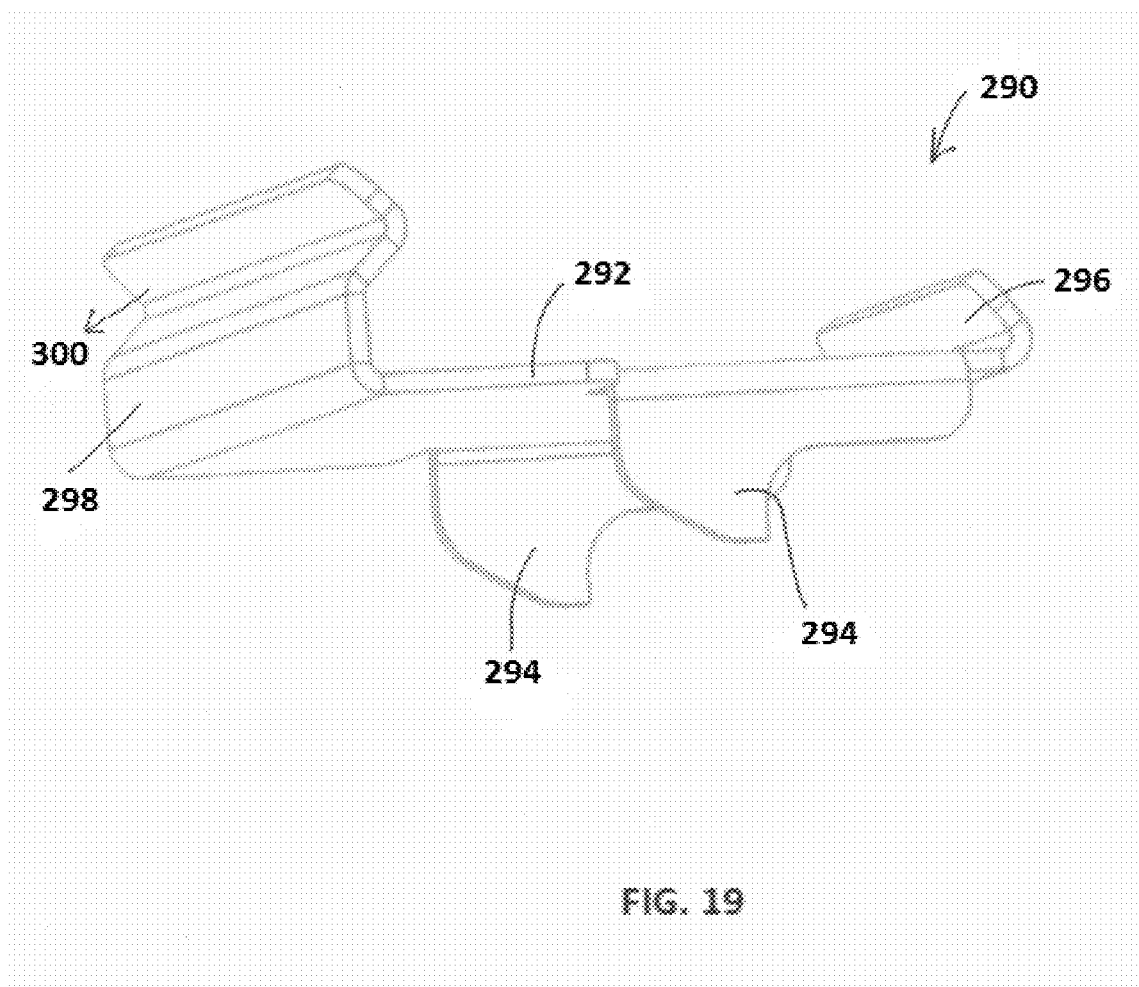
FIG. 19 is an isometric view of a lower attachment component optionally utilized with the panel light assembly of FIG. 7.

Referring now to FIGS. 7-23, an exemplary panel light assembly 100 includes a rectilinear frame structure 102, a light guide member 110, a light source 108, a reflector panel 112, a cover panel 116 and a plurality of brackets 270 and 290 (FIGS. 18 and 19).

Frame structure 102 includes four profile frame members 204 and a plurality of angled brackets 260 (see FIGS. 14 and 17) that are secured together to form a rectilinear frame structure. In at least some cases each frame member 204 includes an extruded rigid member and can be formed of any rigid material including plastic, aluminum, steel, etc. Horizontal upper and lower profile frame members are labelled 224a and 224b in the figures while vertical profile frame members are labelled 222a and 222b. The profile frame members have similar cross sections and therefore only one of the profile frame members 224a will be described here in detail where at least some aspects and features of member 224a are labelled with numerals followed by an "a" qualifier. Similar features of frame member 224b are shown with similar numerals followed by a "b" qualifier.

Figure 2:
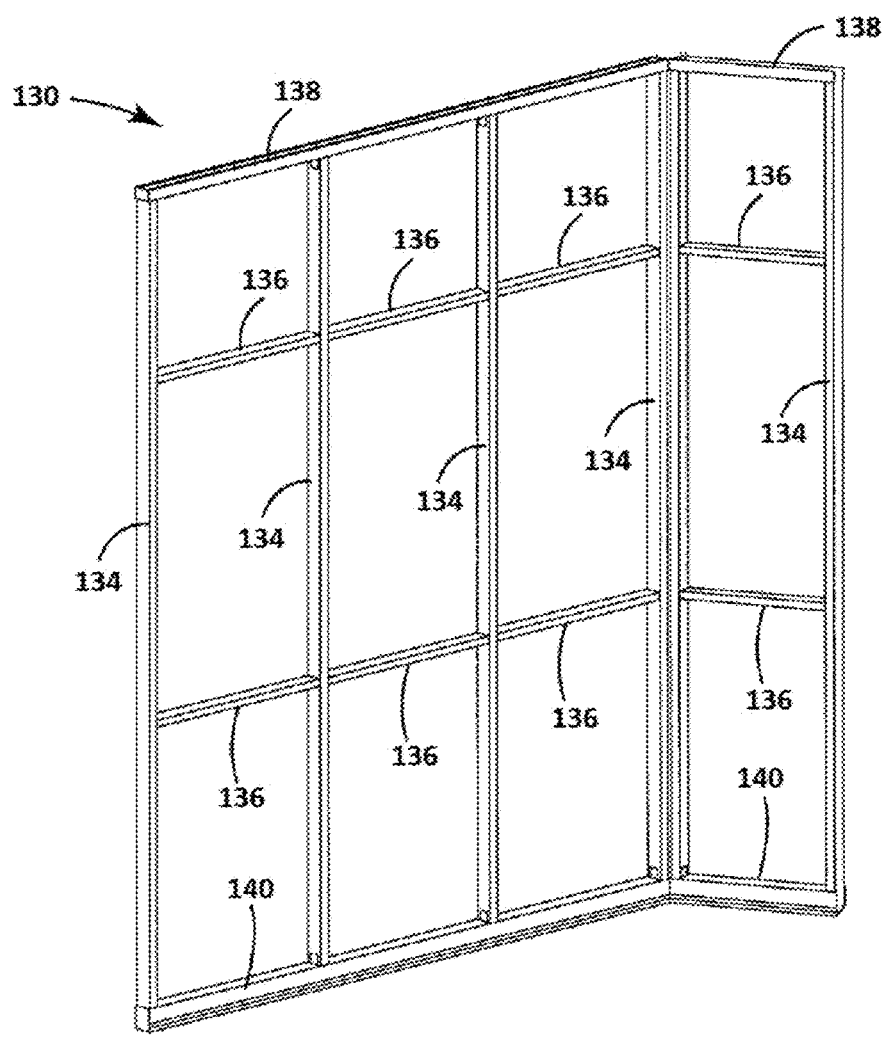
FIG. 2 is an isometric view of a frame assembly.

Referring specifically to FIGS. 12, 16 16A and 16B, exemplary frame member 224a includes a plurality of wall members that together define several channels for receiving and supporting other panel assembly 100 components as well as lip members for securing or engaging mounting brackets for mounting assembly 100 to the support frame structure 130 (see again FIGS. 1 and 2). All cross sectional features of member 224a are formed during a single extrusion process in at least some embodiments and therefore all of the features extend along the length of member 224a unless indicated otherwise.

The component supporting channels includes a U-shaped front channel 228a, a U-shaped intermediate channel 234a and a U-shaped rear channel 352a where an angled flange 210a extends between front channel 228a and intermediate channel 234a. Flanges 210a-210d may be integral with other wall structures that form members 224a, 224b, etc., or may include separate components. In some embodiments a reflector surface may be provided or a separate member top form a reflector surface may be provided to cover a front facing surface of each flange 210a, 210b. In some cases connector flanges 210a, 210b are oriented such that a front facing surface thereof forms an angle of between about 10 degrees to about 90 degrees with respect to a vertical plane (see A in FIG. 11), or about 35 degrees to about 70 degrees, or about 45 degrees with respect to the plane A. Similarly, the lower connector flange 210b forms a front facing surface that forms a similar angle. In some cases the front facing surface angles are identical and in other cases they may be different.

The channel 234a is provided for receiving and mounting light source 108. In order to hide the light source from direct view, channel 234a is relatively deep in some cases.

The bracket engaging lip members include a first lip member 211a that extends generally in a forward direction from a rear surface of frame member 224a in front of the members that form intermediate channel 234a (see FIG. 16) and generally behind flange member 210a and a second lip member 213a that extends generally in a rearward direction from the rear surface of frame member 224a to the rear of the members that form intermediate channel 234a. Lip members 211a and 213a are shaped and dimensioned and are spaced apart such that they can cooperate with features of the brackets 270 shown in FIG. 18 to secure the brackets to the rear portions of frame members 224a as described in greater detail below. Brackets 290 shown in FIG. 19 have features similar to the features of brackets 270 so that those brackets can be mounted to similar lip members 211b and 213b on the lower horizontal frame member 224b.

Figure 16:
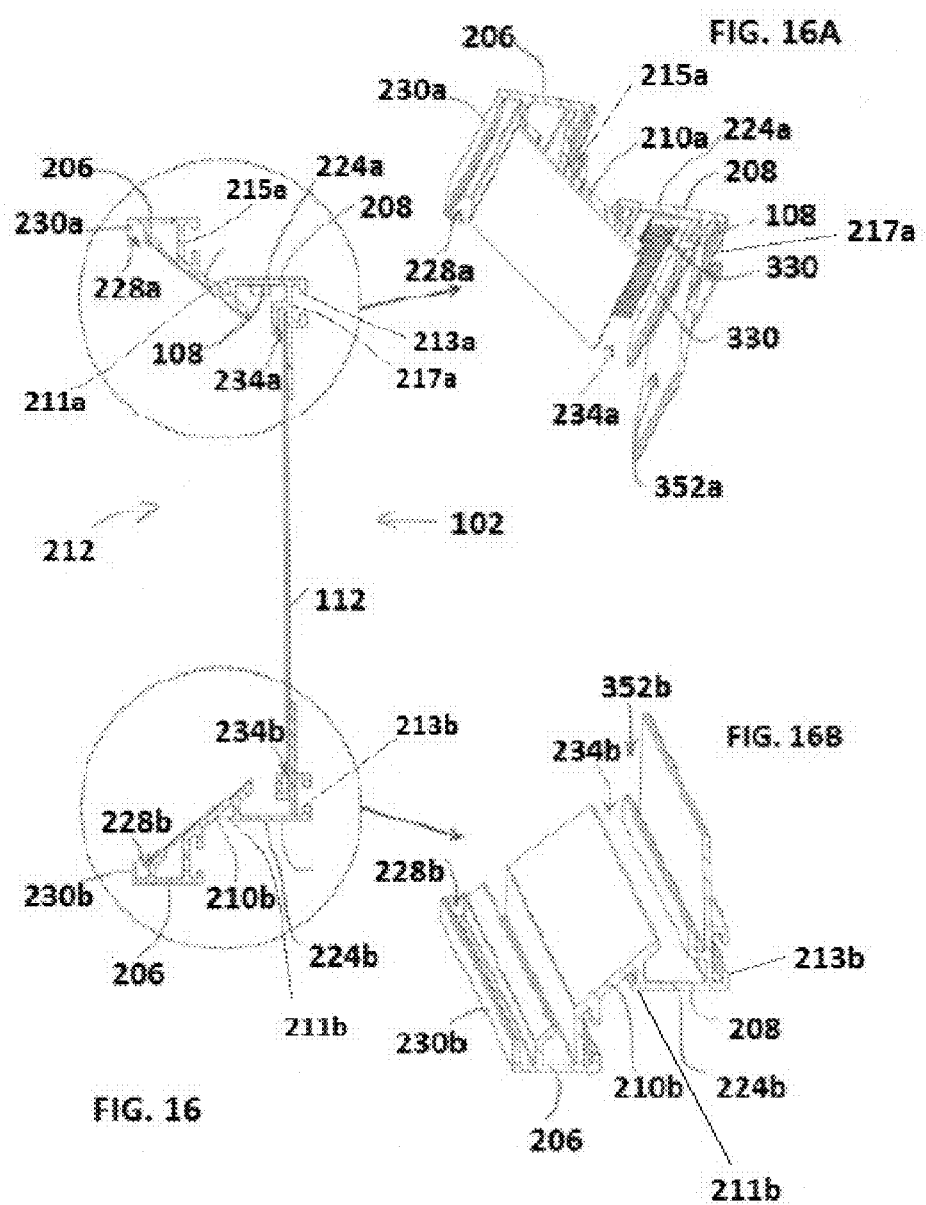
FIG. 16 is a partial cross-sectional view of the frame of FIG. 7 comprising a front and a rear support frame that each include upper and lower horizontal extrusion members, wherein one or more panels have been removed there from for clarity.

Referring still to FIG. 16, frame member 224a also forms two C-shaped receiving channels 215a and 217a on a rear surface. Each receiving channel 215a and 217a is formed via the extrusion process that is used to form member 224a generally and therefore extends along the length of member 224a. Although not shown recesses or openings may be formed in floor surfaces of channels 215a and 217a for receiving distal ends of mounting screws during assembly.

Referring now to FIG. 17, exemplary bracket 260 includes a flat and rigid L-shaped member 262 that includes one or more openings 264 adapted to receive screws (not shown). Member 262 is dimensioned and designed such that the separate legs thereof are snuggly receivable within one of the C-shaped receiving channels 215a or 217a (see again FIG. 16). Other brackets or fasteners for securing corners of frame 102 together are contemplated.

Referring to FIGS. 7 through 10, 13, 14, 15 and 17, brackets 260 are used to secure corners of frame members 224a, 222a, 224b and 222b together to form the rectangular light assembly frame structure 102. To this end, with brackets 260 received in channels 215a, 217a, 215b, 217b and similar channels formed by the horizontal frame members 222a and 222b, screws or other mechanical fasteners are used to secure the brackets and frame members together. In at least some cases one or more of the frame members (e.g., 222b) may be removable for swapping different assembly components to achieve different lighting effects as described below. Once members 222a, 222b, 224a and 224b are secured together, the combination forms a rectangular frame 102 having a front frame portion 206 near a front facing surface 230a, 230b (see FIG. 16) and a rear frame portion 208 where all of the component supporting channels of the frame members are aligned.

Referring to FIG. 18, an exemplary upper mounting bracket 270 is an integral member that includes several features designed to secure the bracket 270 to one of the frame members (e.g., 224a in FIG. 16) and also to interact with features of the support frame structure 130 to secure thereto. To this end, bracket 270 includes a shoulder member 272, an first arm member 278, a first lip member 280, a spring clip structure including a second arm member 284, a finger member 286 and a second lip member 288, first and second leg members 274 and lip members 276. Shoulder member 272 is a generally flat and rigid member that has opposite front and rear edges where first arm member 278 extends in a first direction at substantially 90 degrees to member 272 along the rear edge. Lip member 280 extends from a distal end of arm member 278 opposite shoulder member 272 and generally in the same direction in which shoulder member 272 extends.

Second arm member extends at a substantially 90 degree angle from the front edge of shoulder member 272 and in a direction opposite the direction in which arm member 278 extends. Finger member 286 angled back from a distal end of arm member 284 opposite shoulder member 272 at an approximately 45 degree angle with the primary direction in which member 284 extends. Lip member 288 extends back toward a facing surface of shoulder member 272.

Figure 26:
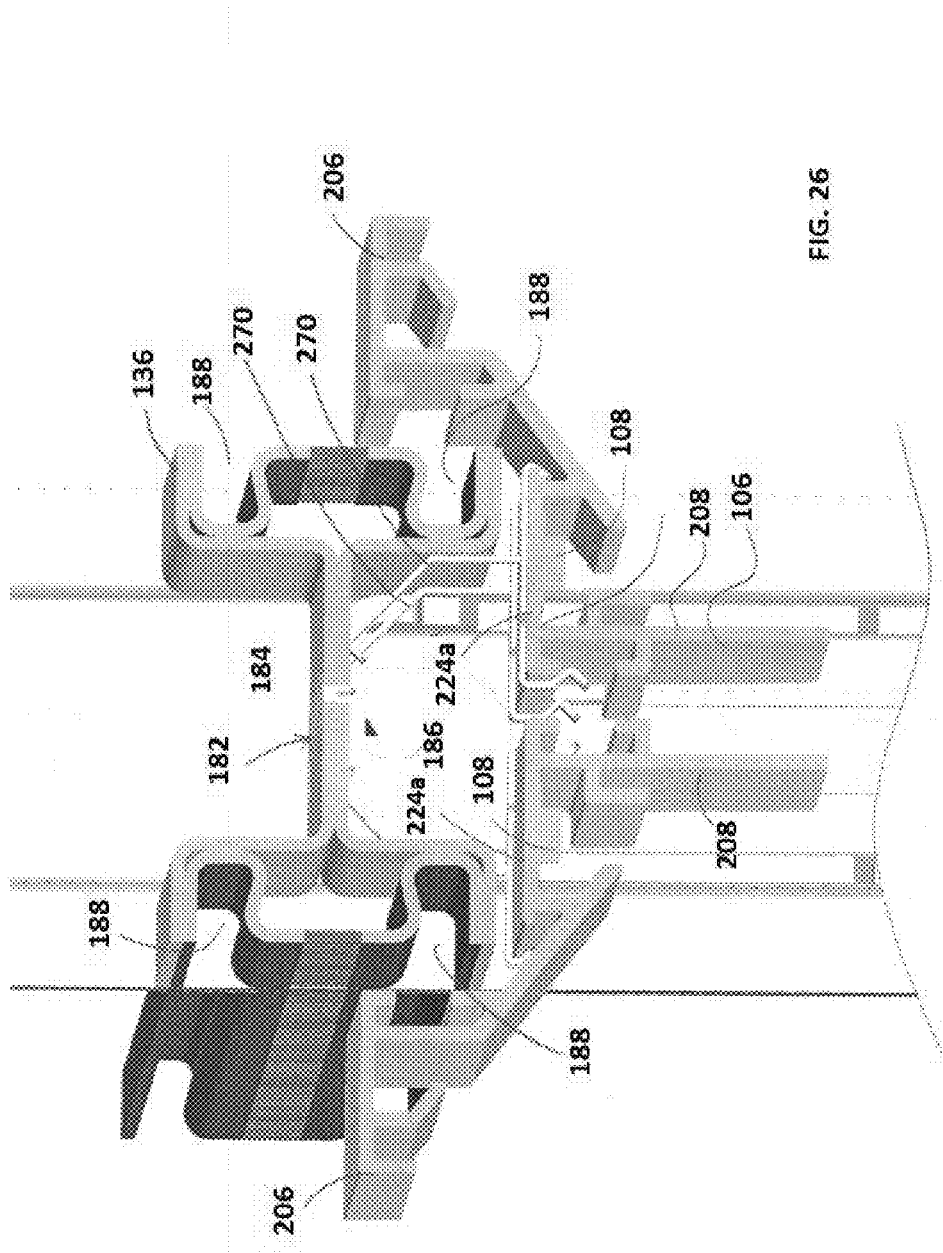
FIG. 26 is a partial isometric view of an upper portion of the panel light assemblies of FIG. 25 with portions removed therefrom for clarity.

Arm members 274 extend from the front edge of member 272 in the same plane as member 272 and on opposite sides of arm member 284. Lip members 276 extend from distal ends of members 274 in the same direction as arm member 278. The combined lengths of members 272 and arm members 276 is similar to the dimension between lip members 211a and 213a (see again FIG. 16) so that lip members 276 and 278 can be secured to the lip members 211a and 213a for mounting bracket 270 to member 224a as best shown in FIG. 26.

Referring to FIG. 19, an exemplary lower mounting bracket 290 is an integral member that includes several features designed to secure the bracket 290 to one of the frame members (e.g., 224b in FIG. 16) and also to interact with features of the support frame structure 130 to secure thereto. To this end, bracket 290 includes a shoulder member 292, an first arm member 298, a first lip member 300, two cam members 294 and a second lip member 296. Shoulder member 272 is a generally flat and rigid member that has opposite front and rear edges where first arm member 298 extends in a first direction at substantially 90 degrees to member 292 along the rear edge. Lip member 300 extends from a distal end of arm member 298 opposite shoulder member 292 and generally in the same direction in which shoulder member 292 extends.

Figure 27:
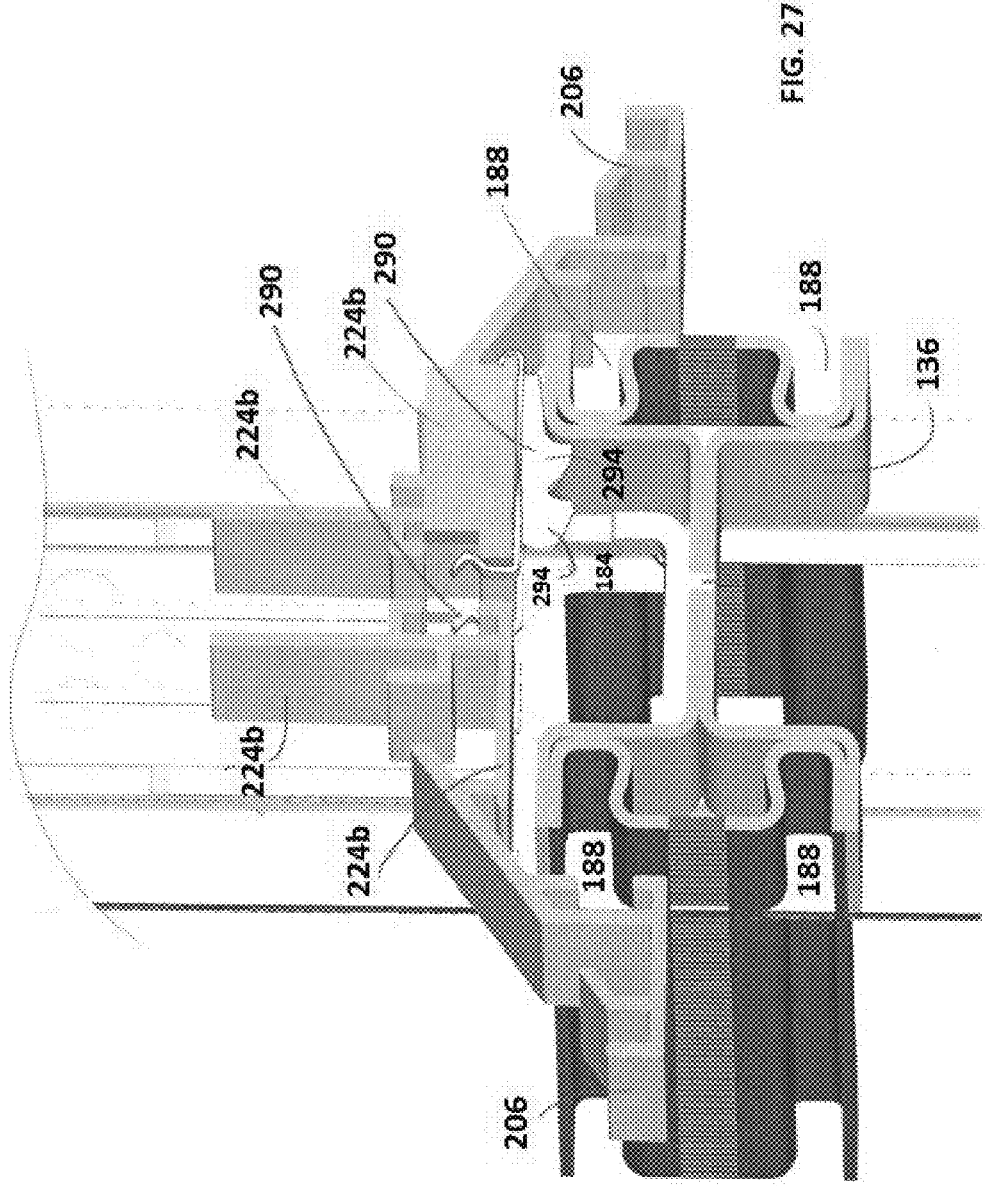
FIG. 27 is a partial isometric view of a lower portion of the panel light assemblies of FIG. 25 with portions removed therefrom for clarity.

Cam members 294 extend from opposite lateral edges of shoulder member 292, are parallel to each other, and form wedge surfaces 295 that generally face in the direction of the front edge of shoulder member 292. Lip member 296 extends from the front edge of shoulder member 292 in the same direction as arm member 298. The length of member 292 is similar to the dimension between lip members 215a and 217a (see again FIG. 16) so that lip members 296 and 298 can be secured to the lip members 215a and 217a for mounting bracket 290 to member 224b as best shown in FIG. 27.

Figure 20:
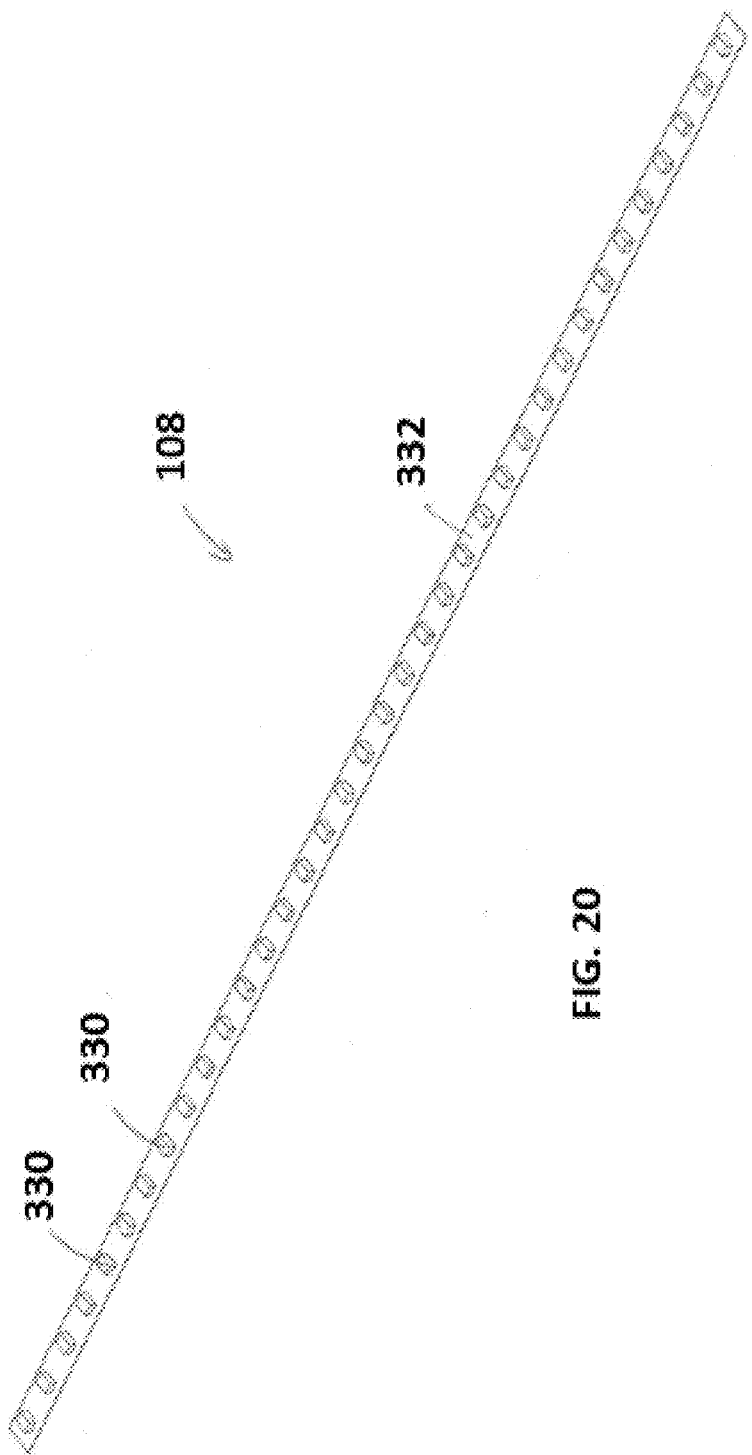
FIG. 20 is an isometric view of a light source in the form of a strip of LEDs for use in a panel light assembly.

Referring to FIG. 20, light source 108 includes a plurality of LEDs 330 mounted to a top surface of a printed circuit board 332. The exemplary source includes 36 LEDs mounted to the board. Not shown is a linkage to a power source to provide power to the LEDs. Other light sources are contemplated. LEDs 330 contemplated for use with the panel light assembly 100 transmit light at an angle of between about 120 degrees to about 140 degrees. Other embodiments may include hundreds of LEDs, the number of LEDs selected depending upon the amount of light and light pattern desired.

Figure 21:
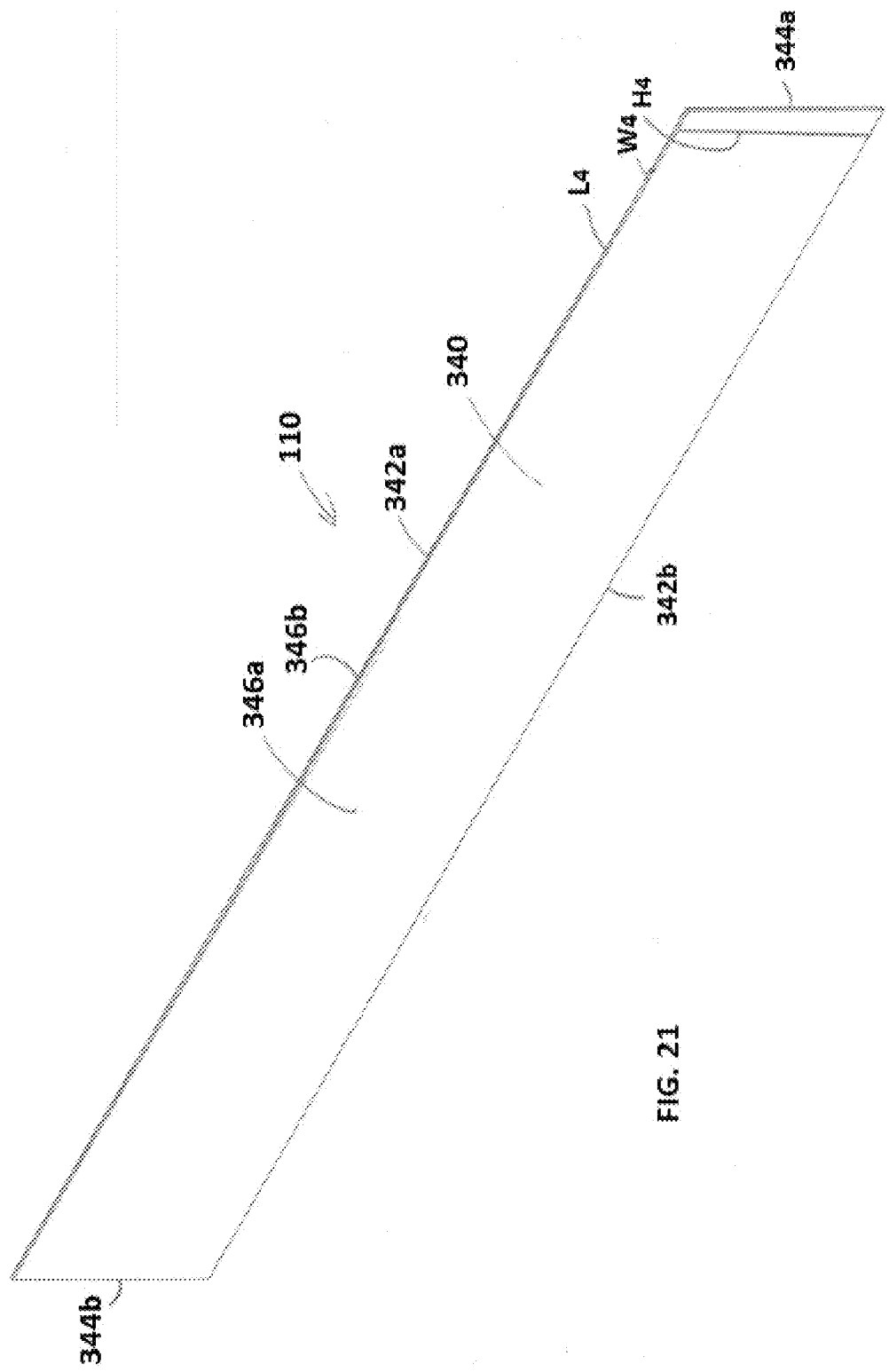
FIG. 21 is an isometric view of a light-emitting panel for use in a panel light assembly.

Referring to FIG. 21 exemplary light-emitting panel or guide member 110 includes an integral rectangular member including a structure 340 bounded by top and bottom edges 342a, 342b, and side edges 344a, 344b to define front and rear opposing surfaces 346a, 346b. In some embodiments each of surfaces 346a and 346b may be smooth and/or polished. In other embodiments a rear surface or portions of the front surface may be etched, frosted or otherwise mechanically disturbed to create a desired lighting effect. In still other cases, portions of panel 110 may be completely clear while other portions are doped with light reflective particles to cause a desired lighting effect.

In at least some cases the edge of member 110 that faces light source 108 (see FIG. 12) after assembly is polished and is generally flat and perpendicular to a central axis of each LED device. In other cases the facing surface may be curved or slightly angled. In some cases edges of member 110 that are not adjacent the light source 108 may be reflective or angled or otherwise mechanically distressed to reflect all or most of the light that makes it to those surfaces back into the guide 110.

Any particle doping within member 100 may be uniform or non-uniform to create different effects. One suitable light-emitting panel 110 is the ACRYLITE® EndLighten T light-emitting panel supplied by Evonik Industries (Parsippany, N.J.). Other suitable light-emitting panels 110 include other light-emitting panels supplied by Evonik, or supplied by other companies that are consistent with the specifications provided herein. Materials used to form panel 110 may include an acrylic, glass, plastic, or any other material suitable to guide light along a volume.

Member 110 is dimensioned to be receivable within channels 234a, 234b formed by the frame members and to substantially fill the space between those channels with some space there above in which the light source 108 is mounted. To this end, member 110 has height, width and length dimensions that are substantially similar to dimensions formed by channels 234a, 234b, etc.

Figure 12:
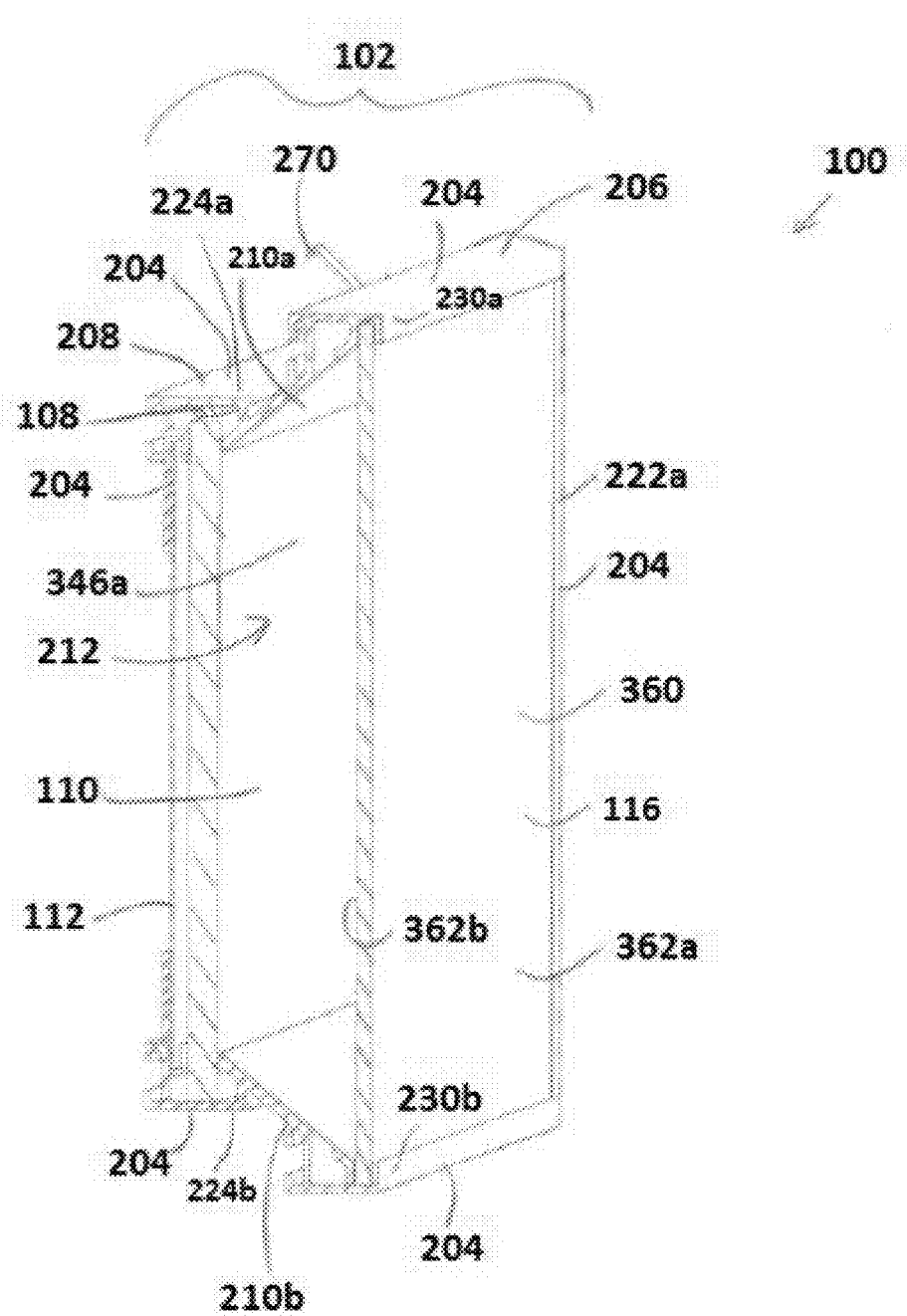
FIG. 12 is a cross-sectional side view of the panel light assembly of FIG. 7, taken generally along the line 6-6 of FIG. 7.
Figure 22:
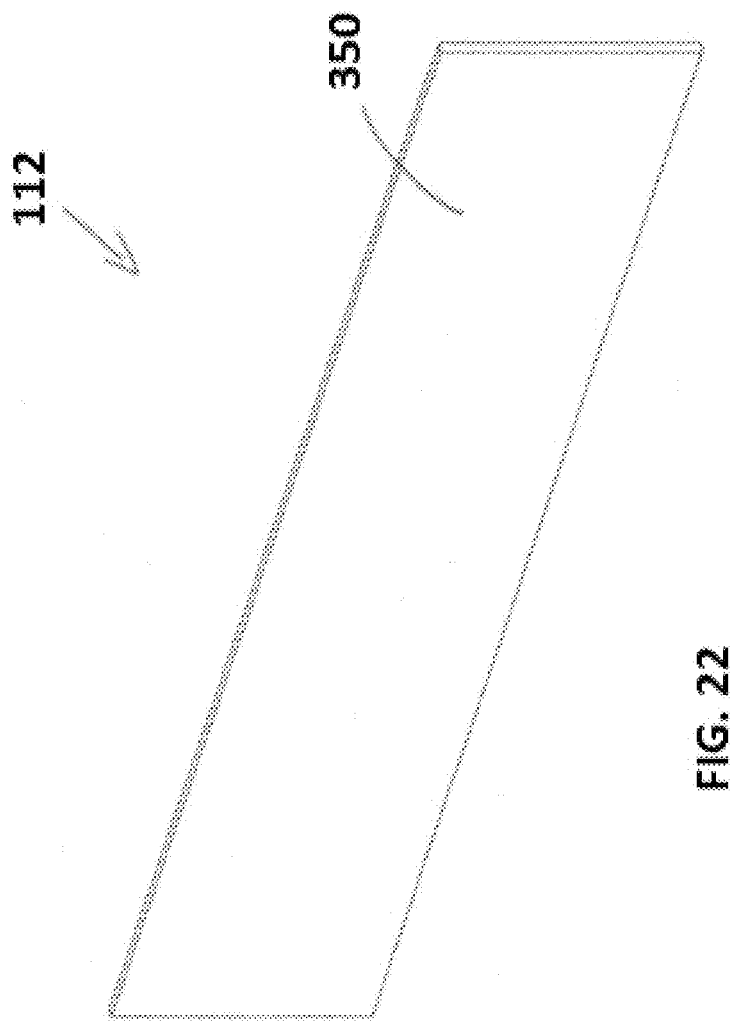
FIG. 22 is an isometric view of a reflector panel for use in a panel light assembly.

Referring to FIGS. 12 and 22, exemplary reflector panel 112 includes a flat, rectangular, and generally rigid or slightly flexible member dimensioned to be received within the rear channels (e.g., see 352a and 352b in FIGS. 16A and 16B) of the profile frame members 224a, 224b, 222a and 222b. Front surface 350 may be colored (e.g., white, blue) or have a reflective surface (e.g., have a mirror surface). In other embodiments surface 350 may be faceted, frosted or otherwise mechanically disturbed to cause a desired lighting effect.

Figure 23:
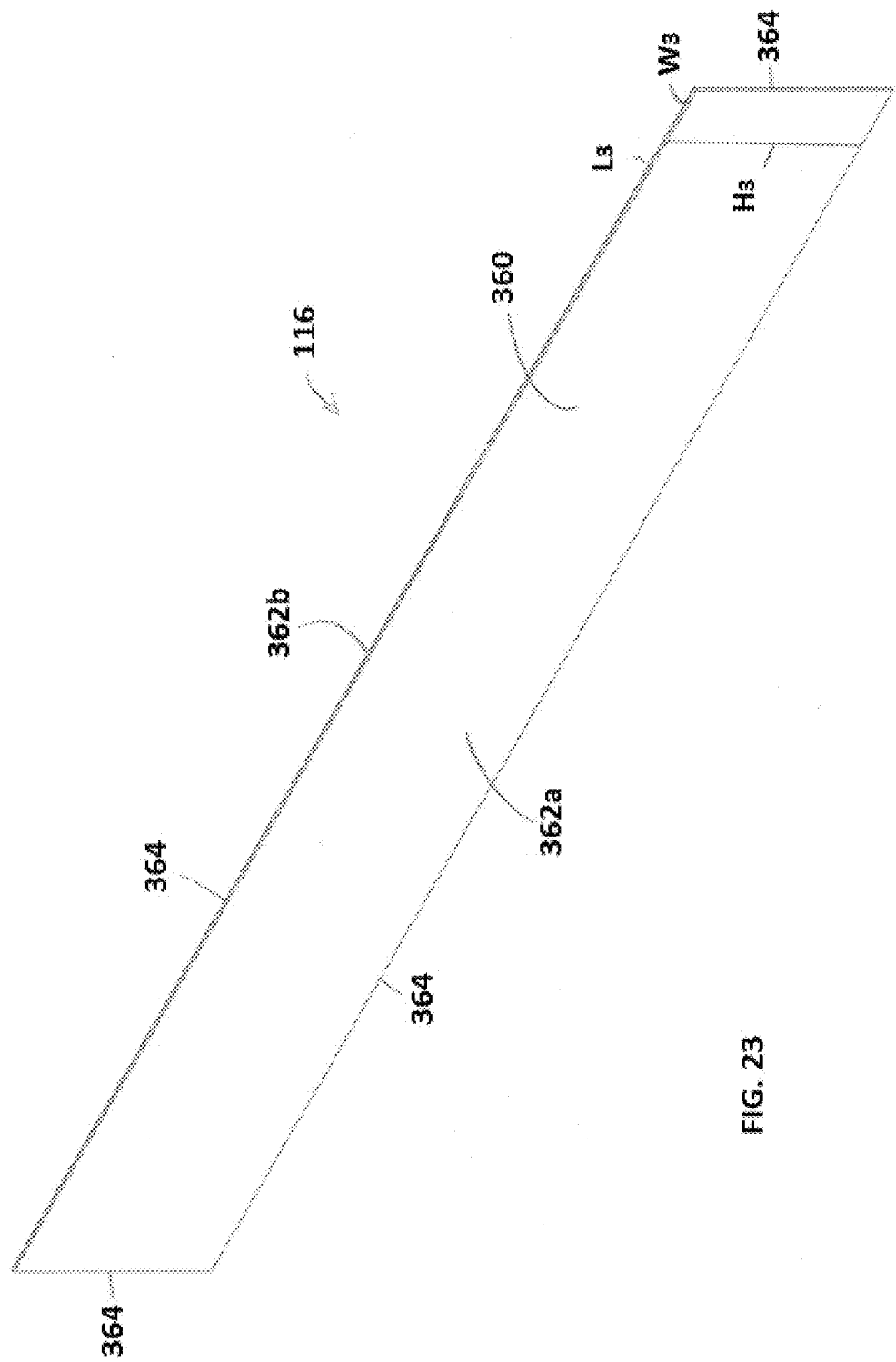
FIG. 23 is an isometric view of a diffuser panel for use in a panel light assembly.
Figure 24:
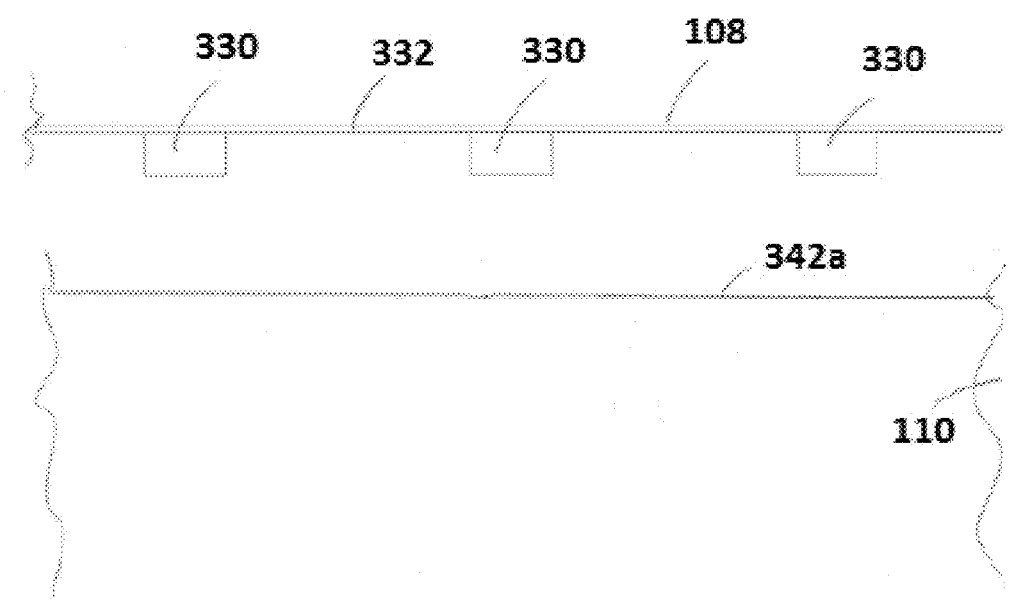
FIG. 24 is side elevational view of the strip of LEDs of FIG. 20 disposed adjacent an edge of the light-emitting panel of FIG. 21.
Figure 25:
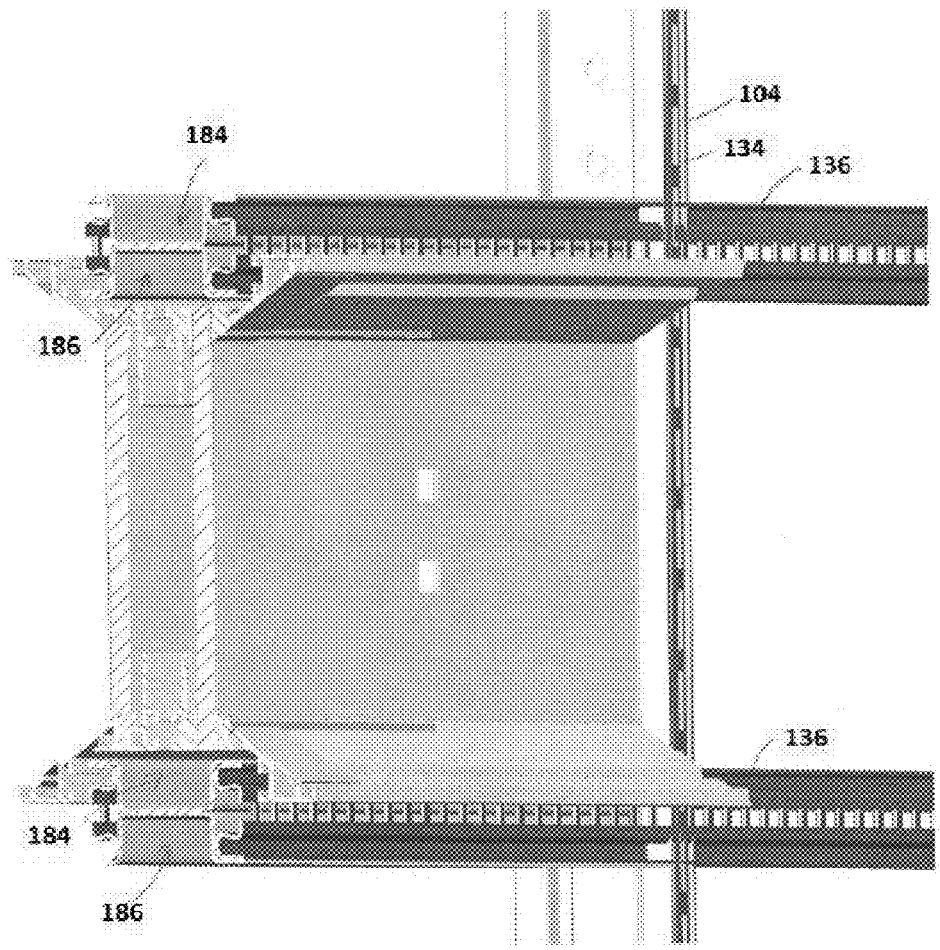
FIG. 25 is an partial sectional view of two panel light assemblies similar to the panel assembly of FIG. 7 disposed on a wall assembly with portions removed therefrom for clarity.

Referring to FIGS. 12 and 23, exemplary cover panel 216 is a substantially rigid rectangular member that includes opposing front and rear surfaces 362a, 362b bounded by four edges 364. The front and rear surfaces 362a, 362b of the diffuser panel 116 may be substantially smooth or may comprise markings, ornamentation, and/or other surface interruptions. In one instance, the front surface 362a is textured and the rear surface 362b is smooth. In a different instance, both the front and rear surfaces 362a, 362b are textured. In a further instance, the front surface 362a is smooth and the rear surface 362b is textured.

In some cases the front and/or rear surfaces 362a, 362b of the diffuser panel 116 may include graphics 366 (see e.g., FIGS. 42-44), a logo, and/or a pattern disposed thereon. Alternatively, one or more objects may be disposed within the body 360 of the cover or diffuser panel 116 to give the appearance of graphics or a pattern. For example, artificial and/or natural components such as branches, leaves, flowers, and the like may be included within the diffuser panel 116. Other shapes, objects, and/or components may be included within and/or on the diffuser panel 116 to provide a desired visual effect.

One of more portions of the body 360 of the diffuser panel 116 may be transparent, translucent, frosted, and/or opaque. One suitable diffuser panel 116 is the ACRYLITE® Satin Ice diffuser sheet supplied by Evonik Industries (Parsippany, N.J.). Other suitable diffuser panels 116 include other diffuser sheets supplied by Evonik, or other sheets supplied by other companies that are consistent with the specifications provided herein. Panel 116 may be formed of glass, acrylic, plastic or some other light transmissive material.

Panel 116 is dimensioned to be substantially the same size as the space defined by the front channels (e.g. 228a, 228b) formed by the frame members 224a, 224b, 222a, 222b such that panel 116 may be retained therein.

Referring again to FIGS. 12 through 17, to assembly the light panel components together to form a light panel 100, first light source 108 is mounted within the upper channel 234a (see specifically FIG. 16A) of upper frame member 224a via mechanical fasteners, adhesive, etc. Next, brackets 260 are used to secure three profile frame members 222a, 224a and 224b together with member 222b left on the side (see FIG. 14). Reflective panel 112 can be slid into the rear channels 352a, 352b with a leading edge thereof received in a channel formed by frame member 222a. Light guide panel 110 can be slid into the intermediate channels 234a, 234b with a leading edge received in a channel formed by frame member 222a. Cover panel 116 can be slid into the front channels 228a, 228b with a leading edge received in a channel formed by frame member 222a. Frame profile member 222b can be slid into engagement with ends of members and so that adjacent edges of members 110, 112 and 116 are received in channels formed by member 222b and can be fastened in place via brackets 260 and screws or other mechanical fasteners.

Figure 13:
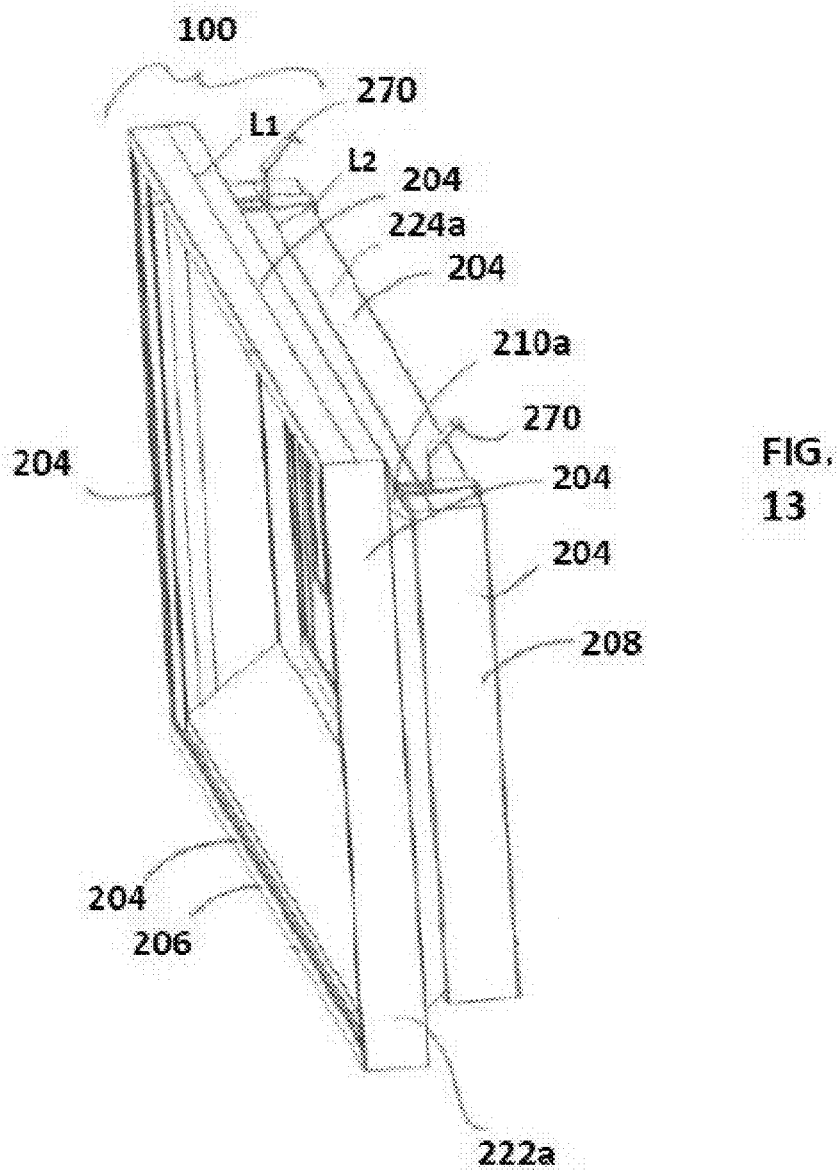
FIG. 13 is an isometric side view of the frame of the panel light assembly of FIG. 7.
Figure 14:
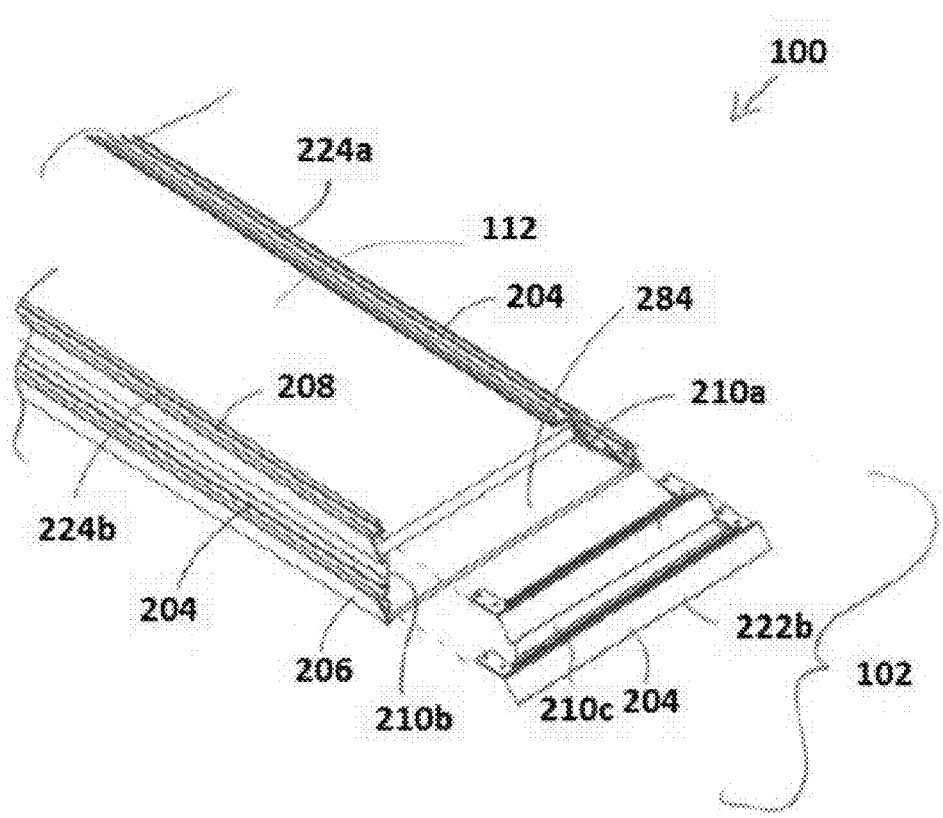
FIG. 14 is a partial exploded view of the frame of the panel light assembly of FIG. 7.
Figure 15:
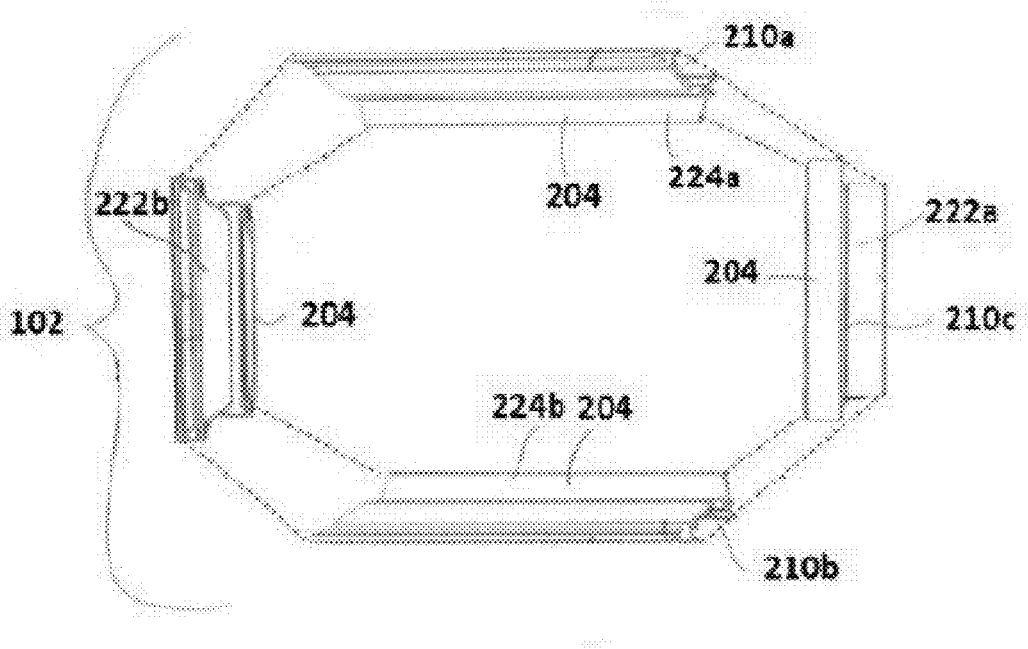
FIG. 15 is a front exploded view of the frame of the panel light assembly of FIG. 7.

Continuing, referring to FIGS. 16, 18 and 26 two or more brackets 270 can be clipped onto top profile frame member 224a with lip members 276 and 280 secured to lip members 211a and 213a. Referring to FIGS. 16, 19 and 27, two or more brackets 290 can be clipped onto bottom profile frame member 224b with lip members 296 and 300 secured to lip members 211b and 213b. At this point the entire light panel assembly 100 has been assembled and will appear as shown in FIG. 13.

To secure the complete assembly 100 to a support frame structure 130 (see again FIGS. 1 and 2), the assembly 100 is aligned with an opening or space formed by structure 130 and is angled so that the upper frame member 224a is closer to the support structure 130 than is the lower frame member 224b. The distal ends of the extending spring clip members 284, 286 and 288 (see again FIG. 18) are slid into channel 186 formed by the support structure 130 so that the distal ends contact the floor surface of the frame member that forms channel 186.

Next, referring to FIGS. 19 and 27, the lower portion of assembly 100 is rotated rearward until cam members 290 contact a front surface of a lower support frame member. Further force applied to the lower portion of assembly 100 causes the can surfaces to ride upward on the lower support frame member until the cam members 290 slip into the frame member channel 184. As the cam members 290 ride upward, the entire assembly 100 is raised and the spring clip members 284, 286, 288 are bent to apply an expansive force to the top support frame member. Once the cam members 290 slip into the channel 184, wedge surface 294 (see again FIG. 19) are received on facing surfaces of the lower support frame member 136 and lock assembly 100 to the support frame 130.

Referring to FIGS. 26 and 27, after an assembly 100 is mounted to a support frame structure 130, front surfaces of the frame members 224a, 224b, 222a and 222b provide front finished fascia surfaces to one side of frame members 224a, 224b, 222a or 222b. The cover members 116 are substantially flush with the front surfaces of members 136. In addition, the dimensions of members 224a, 224b, 222a and 222b may be such that the front surfaces thereof are substantially flush with front surfaces of adjacent panel assemblies of different types (e.g. opaque, glass, etc.) so that a well finished appearance results. In addition, as shown in FIGS. 26 and 27, frame members 224a and 224b may be dimensioned so that they do not cover the slots formed by members 136 so that those slots can be accessed for mounting other components.

Depending on capabilities of light source 108 and features of panel 110, panel member 110 transmits light therefrom according to specific luminance values. In one embodiment, the luminance parameter of light transmitted is between about 1,500 lm/m to about 2,000 lm/m, or between about 1,700 lm/m to about 1,800 lm/m, or about 1,730 lm/m, as determined using a reflector (not shown) and white poster (not shown). In another instance, the luminance parameter of light transmitted there through is between about 1,500 cd/m$^3$ to about 1,700 cd/m$^3$ through an area of between about 1 mm to about 300 mm. In a different instance, the luminance of light transmitted there through is between about 500 cd/m$^3$ to about 800 cd/m$^3$ through an area of between about 300 mm to about 600 mm. In another instance, the luminance of light transmitted there through is between about 200 cd/m$^3$ to about 400 cd/m$^3$ through an area of between about 600 mm to about 1200 mm. In a different instance, the luminance of light transmitted there through is between about 100 cd/m$^3$ to about 300 cd/m$^3$ through an area of between about 1200 mm to about 2000 mm.

In operation, power is supplied to light source 108 and the light source 108 is turned on via a controller (not shown) or user interface (not shown). Light rays are transmitted from the light source 108 to the edge of light-emitting panel or guide member 110. The light rays travel through guide member 110 with some of the light leaking out to either side of member 110. Light leaking out toward cover member 116 travels through member 116 and into a space adjacent wall assembly 104. Light leaking out toward reflector member 112 is reflected off the front surface of member 112, passes back into and through member 110 and then passes through the cover member 116 and into the space adjacent wall assembly 104.

By selecting member 110 to have specific light leaking properties, the pattern of light generated by assembly 100 can be designed. For instance, member 110 may be non-uniformly dopes with light reflecting particles such that the combined light transmitted from essentially any part of the front surface of cover member 116 has a uniform intensity at any location. In other cases doping or surface mechanics can be designed to create other desirable lighting effects.

While light source 108 is shown in the illustrated embodiment as being located within a channel formed by the upper frame member 224a, in other embodiments the source 108 may be mounted within channels formed by one or more of the lower profile frame member 224b or the side members 222a or 222b for directing light into the edge of a guide member 110.

Referring again to FIGS. 26 and 27, in at least some embodiments frame members 224a, 224b, 222a and 222b may have depth dimensions such that an assembly only extends less than half way into a support frame space defined by the frame members 134, 136. In this case, another light panel assembly 100 may be mounted to the other side of the frame members 136 and 134 so light can be provided simultaneously to both sides of the support frame. In the alternative, another option would be to provide an opaque panel assembly on the second side of the frame members 134, 136.

Figure 28:
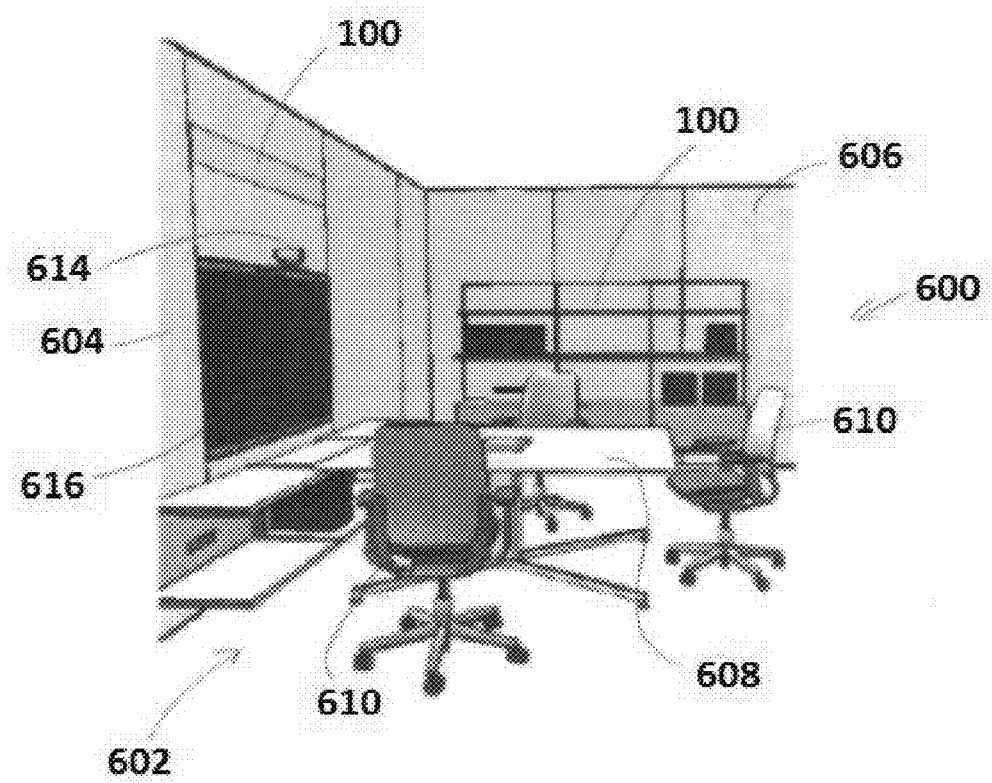
FIG. 28 is a diagrammatic view of a panel light assembly in one embodiment.

Now specifically referring to FIG. 28, one exemplary configuration 600 that is consistent with various aspects of the present invention is illustrated. Configuration 600 includes a workspace in the form of a conference room 602 having a first wall 604 and a second wall 606 extending perpendicularly therefrom. The conference room 602 may include a table 608, one or more chairs 610, and/or other components typically associated with a conference room 602. A video conferencing system is optionally included in the conference room 602 and includes a camera 614 (shown in this embodiment mounted to wall 604) and a screen 616. In this instance, the panel light assembly 100 is provided on wall 604 above the screen 616 and camera 614 to provide light that is at least somewhat optimized for telepresence activities. In this regard, where assembly 100 includes a light source along a top edge thereof, the light from the light guide member in assembly 1000 will typically leak light out downwardly and outwardly which will tend to illuminate conferees in front of screen 616. Because the light from assembly 100 is indirect, there is no direct light into conferee eye's and hence there is little eye fatigue associated with use of the panel light assembly 100.

Referring still to FIG. 28, in some embodiments two panel light assemblies 100 are located in conference room 602 such that a preferred amount of ambient light is provided in conjunction with the use of the video conferencing system. For example, the two panel light assemblies 100 may be disposed in a horizontal orientation adjacent a top portion of each of the walls 604, 606. Additionally, the two panel light assemblies 100 may be disposed in an upper half of the walls 604, 606.

By providing light assemblies 100 in two or three different walls about a telepresence or conference space particularly advantageous lighting effects can be provided. For instance, while light from one assembly 100 may be insufficient to illuminate a person's face during conferencing, the combination of light from multiple assemblies 100 at different locations may be sufficient.

Figure 29:
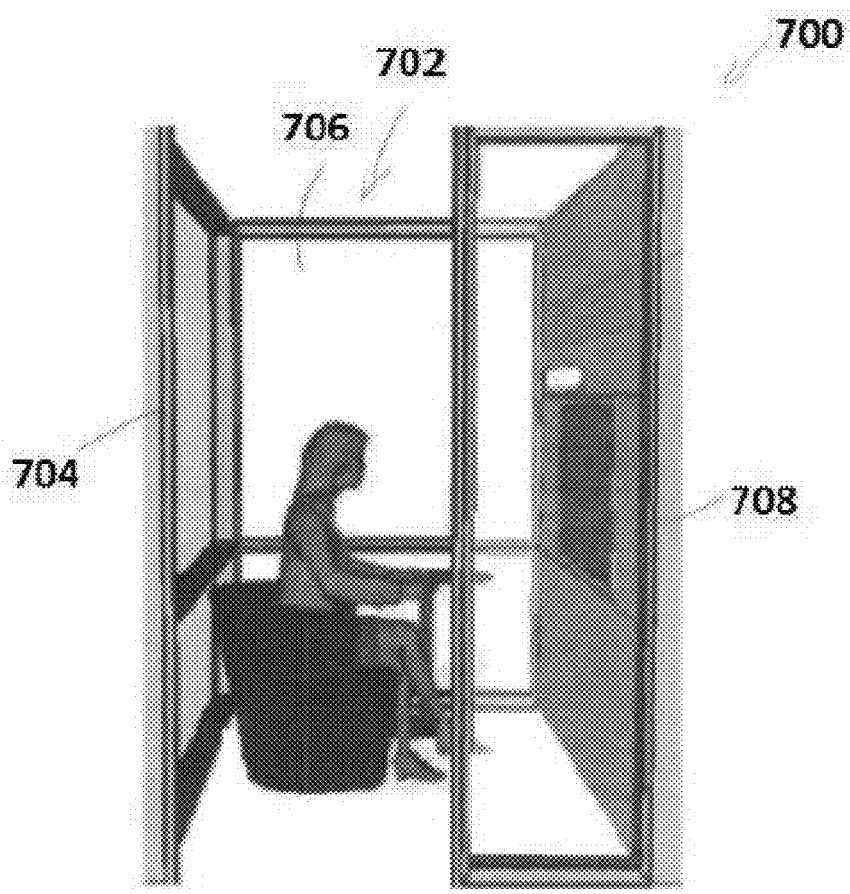
FIG. 29 is a diagrammatic view of a panel light assembly in another embodiment.

In FIG. 29, configuration 700 is depicted that is consistent with various aspects of the present invention. Configuration 700 is designed as an individual workspace 702 characterized as having an area dimension of less than about 1.5 m$^2$. The individual workspace 702 may be used in a variety of manners including, for example, as an individual office space, a video chat booth, a privacy room, or the like. The individual workspace 702 includes one or more walls 704, 706, 708 forming a substantially enclosed space. In this configuration, two assemblies 100 are used to configure wall 706 to light up that entire wall.

Figure 30:
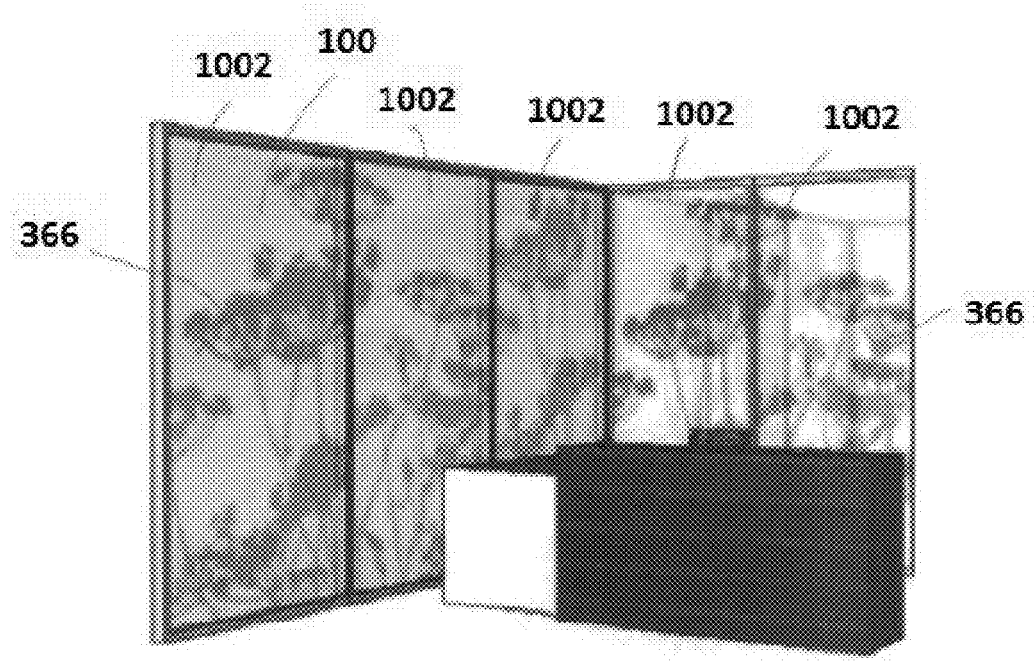
FIG. 30 is a diagrammatic view of a panel light assembly in a different embodiment.
Figure 31:
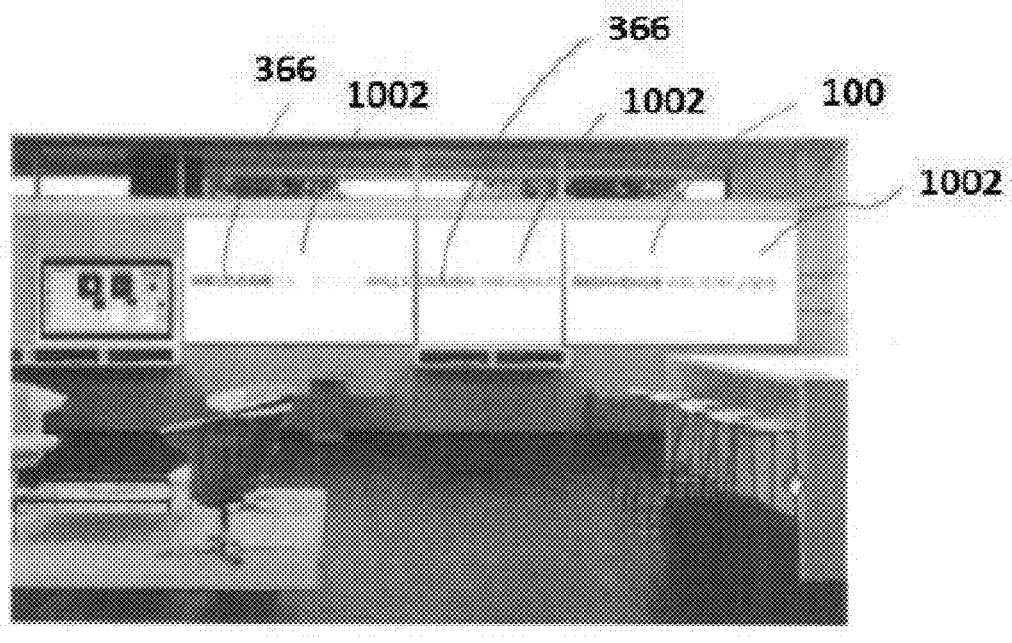
FIG. 31 is a diagrammatic view of a panel light assembly in yet another embodiment.

In another configuration 1000 depicted in FIGS. 30 and 31, various components of the panel light assembly 100 are utilized to form one or more full lit wall panels 1002. In this configuration 1000, the panel light assembly 100 defines an entire wall such that illumination is provided over substantially the entire surface thereof. The wall 1002 optionally includes graphics 366 disposed thereon. In one instance, the wall 1002 may emit light though a single surface (e.g., a front surface). In a different instance, the wall 1002 may emit light through a second surface (e.g., a rear surface). In a further instance, the wall 1002 may emit light through both surfaces.

The panel light assemblies 100 form one or more walls 1002 in the configuration depicted in FIGS. 31 and 32 are generally larger in size as a result. For example, the frame of the panel light assembly 100 is preferably substantially similar to the dimensions of a wall that would be provided in the same space. Further, additional light sources 108 may be utilized due to the larger panel light assembly 100 size. Additionally, the panel light assemblies 100 forming walls 1002 and/or partial walls may be oriented in either a horizontal or vertical manner.

In any of the configurations discussed herein, it is contemplated that the panel light assembly 100 may be controlled using an interface (not shown). The panel light assembly 100 is in communication with the interface such that a user may control the functionality associated therewith. For example, the interface may include one or more options including a power control, intensity control, specific control over one or more parts of the light source 108, numerous light sources 108, and all other functionality relating to the panel light assembly 100. The interface may be provided as a physical component associated with the panel light assembly 100 (e.g., a control box disposed in a wall, desk, or the like). In another instance, the interface may be provided as a computer application transmitted to a personal computer, a tablet computer, a smart cellular phone, and/or via other computer means.

While the invention may be susceptible to various modifications and alternative forms, specific embodiments have been shown by way of example in the drawings and have been described in detail herein. However, it should be understood that the invention is not intended to be limited to the particular forms disclosed. Thus, the invention is to cover all modifications, equivalents, and alternatives falling within the spirit and scope of the invention as defined by the following appended claims.

What is claimed is:

1. A panel light assembly for use with a support frame including at least first and second support frame members, the assembly comprising:
    an assembly frame including at least a first assembly frame member and a second assembly frame member spaced apart on opposite sides of a frame space, the first assembly frame member forming a channel;
    a light source supported by the first assembly frame member within the channel to emit light within the channel;
    a light guide member including a front surface and a rear surface and at least one edge between the front and rear surfaces, the light guide supported by the first and second assembly frame members within the frame space with at least a portion of the at least one edge located within the channel formed by the first assembly frame member adjacent the light source;
    a fastener for fastening the assembly frame to the first and second support frame members;
    wherein, after the assembly frame is fastened to the first and second support frame members, the front surface of the light guide member faces an open space adjacent the support frame.

2. The assembly of claim 1 wherein each of the first and second assembly frame members includes first and second ends and the assembly frame further includes third and fourth assembly frame members, the third assembly frame member extending between and connected to the first ends of the first and second assembly frame members and the fourth assembly frame member extending between and connected to the second ends of the first and second assembly frame members, each of the assembly frame members forming a channel and receiving at least a portion of the edge of the light guide member.

3. The assembly of claim 2 further including a flange member supported by the assembly frame and forming a surface that at least in part circumscribes the front surface of the light guide member and that angles outwardly from the front surface.

4. The assembly of claim 3 wherein the flange member surface that angled outwardly from the front surface is reflective.

5. The assembly of claim 3 further including an at least partially translucent cover member supported by the assembly frame on a side of the light guide member adjacent the front surface.

6. The assembly of claim 5 wherein the flange member surface extends between the light guide member and the cover member.

7. The assembly of claim 6 wherein the cover member is a diffuser member.

8. The assembly of claim 1 further including a reflector member supported by the assembly frame on a side of the light guide member adjacent the rear surface.

9. The assembly of claim 8 wherein the reflector member includes a reflective surface that faces the rear surface of the light guide member.

10. The assembly of claim 8 further including an at least partially translucent cover member supported by the assembly frame on a side of the light guide member adjacent the front surface.

11. The assembly of claim 10 wherein each of the first and second assembly frame members includes first and second ends and the assembly frame further includes third and fourth assembly frame members, the third assembly frame member extending between and connected to the first ends of the first and second assembly frame members and the fourth assembly frame member extending between and connected to the second ends of the first and second assembly frame members, each of the assembly frame members forming a channel and receiving at least a portion of the edge of the light guide member, each of the cover member and the reflector member including an edge and the assembly frame members each including additional channels for receiving edges of the cover member and the reflector member.

12. The panel light assembly of claim 1 wherein the light source comprises a strip of LEDs mounted to a circuit board which is in turn mounted within the channel formed by the first assembly frame member.

13. The panel light assembly of claim 1 wherein the first and second support frame members form a support frame space and facing channels, the fastener extends into each of the facing channels to secure the frame assembly to the support frame and at least portions of the first and second assembly frame members are disposed to one side of the support frame space.

14. The panel light assembly of claim 13 wherein each of the first and second assembly frame members forms a finished fascia to the one side of the support frame space, the assembly further including at least one opaque panel assembly mounted to the support frame adjacent the panel light assembly, the finished fascia of the assembly frame members substantially flush with an external finished surface of the opaque panel assembly.

15. A panel light assembly for use with a support frame including at least top and bottom support frame members, the assembly comprising:
    an assembly frame including assembly frame members that form a rectangular assembly frame that defines a frame space, the assembly frame members forming at least a first continuous channel about an internal portion of the assembly frame;
    a line light source supported within the channel formed by at least one of the assembly frame members;
    a rectangular light guide member including a front surface, a rear surface and a circumscribing edge between the front and rear surfaces, the circumscribing edge received in the channel formed by the assembly frame members with at least a portion of the edge adjacent the line light source;

a fastener for fastening the assembly frame to the first and second support frame members;

wherein, after the assembly frame is fastened to the first and second support frame members, the front surface of the light guide member faces an open space adjacent the support frame.

16. The assembly of claim 15 further including at least a second line light source supported within the channel formed by at least a second of the assembly frame members.

17. The assembly of claim 15 further including a rectangular reflector member supported within the assembly frame adjacent the rear surface of the light guide member and a cover member supported within the assembly frame adjacent the front surface of the light guide member.

18. The assembly of claim 15 wherein the fastener includes an upper bracket mounted to an upper assembly frame member wherein the upper bracket cooperates with the top frame member of the support frame to secure the assembly frame to the support frame.

19. The assembly of claim 18 wherein the upper bracket includes a leaf spring arm member that engages a downward facing channel formed by the top frame member.

20. The assembly of claim 19 further including a lower bracket including at least one wedge surface that cooperates with the bottom frame member of the support frame to secure the assembly frame to the support frame.

21. A panel light assembly for use with a support frame including at least top and bottom support frame members that form facing channels, the assembly comprising:

an assembly frame including assembly frame members that form a rectangular assembly frame that defines a frame space, the assembly frame members forming at least a first continuous channel about an internal portion of the assembly frame, the assembly frame members including an upper assembly frame member;

a line light source supported within the channel formed by at least one of the assembly frame members;

a rectangular light guide member including a front surface, a rear surface and a circumscribing edge between the front and rear surfaces, the circumscribing edge received in the channel formed by the assembly frame members with at least a portion of the edge adjacent the line light source; and a bracket including a leaf spring arm member that mounts to the upper assembly frame member and that is at least in part received in the channel formed by the top frame member of the support frame to secure the assembly frame to the support frame.

* * * * *